(12) United States Patent
Bonk et al.

(10) Patent No.: US 12,024,251 B2
(45) Date of Patent: Jul. 2, 2024

(54) SYSTEM AND METHOD FOR A STANDUP MOTORIZED TRANSPORT UTILITY VEHICLE

(71) Applicant: LyteHorse Labs, Inc., Regina (CA)

(72) Inventors: Bradley James Bonk, Regina (CA); Allen William Bonk, Regina (CA)

(73) Assignee: LyteHorse Labs, Inc., Regina (SK)

( * ) Notice: Subject to any disclaimer, the term of this patent is extended or adjusted under 35 U.S.C. 154(b) by 56 days.

(21) Appl. No.: 17/076,754

(22) Filed: Oct. 21, 2020

(65) Prior Publication Data

US 2021/0114654 A1 Apr. 22, 2021

Related U.S. Application Data

(60) Provisional application No. 62/924,682, filed on Oct. 22, 2019.

(51) Int. Cl.
| | |
|---|---|
| *B62D 7/14* | (2006.01) |
| *B62D 51/00* | (2006.01) |
| *B62D 51/02* | (2006.01) |
| *B62D 61/00* | (2006.01) |
| *B60G 3/14* | (2006.01) |
| *B62D 1/02* | (2006.01) |

(52) U.S. Cl.
CPC ........... *B62D 7/142* (2013.01); *B62D 51/001* (2013.01); *B62D 51/02* (2013.01); *B62D 61/00* (2013.01); *B60G 3/14* (2013.01); *B62D 1/02* (2013.01)

(58) Field of Classification Search
CPC ...... B62D 7/142; B62D 51/001; B62D 51/02; B62D 61/00; B62D 1/02; B60G 3/14; B60G 2300/124
See application file for complete search history.

(56) References Cited

U.S. PATENT DOCUMENTS

| | | | |
|---|---|---|---|
| 7,757,794 B2 * | 7/2010 | Heinzmann | B62K 5/01 180/282 |
| 9,073,585 B2 * | 7/2015 | Jackson | B62D 29/041 |
| 9,499,215 B2 * | 11/2016 | Theodore | B62K 15/006 |
| 10,052,247 B2 * | 8/2018 | Vereen, III | A61G 5/1078 |
| 11,305,816 B2 * | 4/2022 | Hsu | B62D 9/002 |
| 2020/0253799 A1 * | 8/2020 | Daniel | A61G 5/1051 |
| 2023/0014298 A1 * | 1/2023 | Agnew | B62D 51/02 |

* cited by examiner

*Primary Examiner* — Minnah L Seoh
*Assistant Examiner* — Marlon A Arce

(57) ABSTRACT

A motorized personal transport utility vehicle comprises a frame, independent front and rear suspension and a plurality of wheel hubs. Each suspension arm is pivotally coupled to a central frame portion. A pair of front wheel hubs are coupled to the front suspension arms and a pair of rear wheel hubs are coupled to the rear suspension arms. Each of the wheel hubs includes an integrated electric hub motor. The front and rear suspension arms are configured such that the front wheel hub track width is greater than the rear wheel hub track width such that the inner width between the insides of the front wheel hubs is greater than the outer width between the rear wheel hubs.

12 Claims, 39 Drawing Sheets

SYSTEM AND METHOD FOR A STANDUP MOTORIZED TRANSPORT UTILITY VEHICLE

CROSS REFERENCE TO RELATED APPLICATIONS

The application claims priority to and the benefit of U.S. Provisional Patent Application Ser. No. 62/924,682, entitled "UTILITY VEHICLE", filed on Oct. 22, 2019, of which is incorporated herein by reference in its entirety.

BACKGROUND

The embodiments described herein motorized vehicles, and more particularly to a single-rider, standup electric utility vehicle with off-set wheels front to back.

Traditional small utility vehicle designs all have parallel wheels and axles. As a result, they are cumbersome in turning, create ruts in lawn surfaces, catch on corners in tight turns, and cannot turn sharply with a trailer attached without causing potential damage.

For example, conventional motorized golf carts have parallel wheels and axles, which even with distributed weight, create ruts in the ground because the rear wheels follow the respective front wheels in the same path. This creates greater depressions in the turf. Off-road all-terrain vehicles (ATV's) are unstable on side hills and are prone to tipping over.

Therefore, there is an ongoing need to provide a personal motorized utility vehicle that that addresses the drawbacks of conventional motorized utility vehicles.

SUMMARY

A motorized personal transport utility vehicle comprises a frame, independent front and rear suspension and a plurality of wheel hubs. Each suspension arm is pivotally coupled to a central frame portion. A pair of front wheel hubs are coupled to the front suspension arms and a pair of rear wheel hubs are coupled to the rear suspension arms. Each of the wheel hubs includes an integrated electric hub motor. The front and rear suspension arms are configured such that the front wheel hub track width is greater than the rear wheel hub track width such that the inner width between the insides of the front wheel hubs is greater than the outer width between the rear wheel hubs.

The present invention addresses the drawbacks and weaknesses of the prior art by providing a motorized personal transport utility vehicle. The utility vehicle generally comprises a frame, independent front and rear suspension and a plurality of wheel hubs. Each suspension arm is pivotally coupled to a central frame portion. A pair of front wheel hubs are coupled to the front suspension arms and a pair of rear wheel hubs are coupled to the rear suspension arms. Each of the wheel hubs includes an integrated electric hub motor. The front and rear suspension arms are configured such that the front wheel hub track width is greater than the rear wheel hub track width such that the inner width between the insides of the front wheel hubs is greater than the outer width between the rear wheel hubs. Additional features, aspects and advantages of the invention will be discussed herein below.

The user drives the vehicle while standing atop a planar platform on the central frame portion and grabbing the handlebars. The user actuates the throttle and brakes to drive the utility vehicle.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The invention is to cover all modifications, equivalents, and alternatives falling within the scope of the invention as defined by the appended claims.

The various features or aspects discussed herein can also be combined in additional combinations and embodiments, whether or not explicitly discussed herein, without departing from the scope of the invention.

Overall Design

Figure 1:
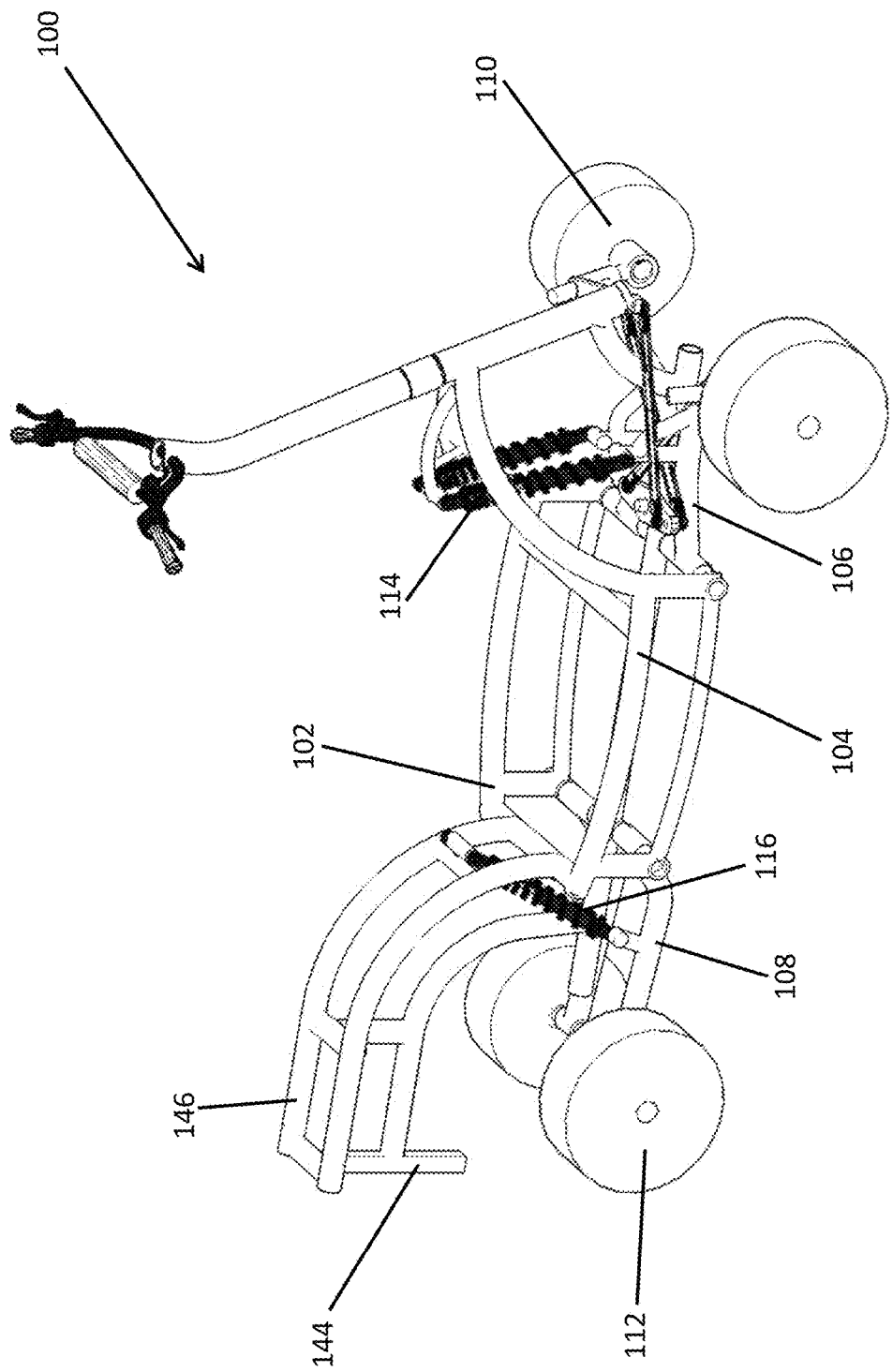
FIG. 1 is a perspective view of a utility vehicle in accordance with certain embodiments of the invention.
Figure 2:
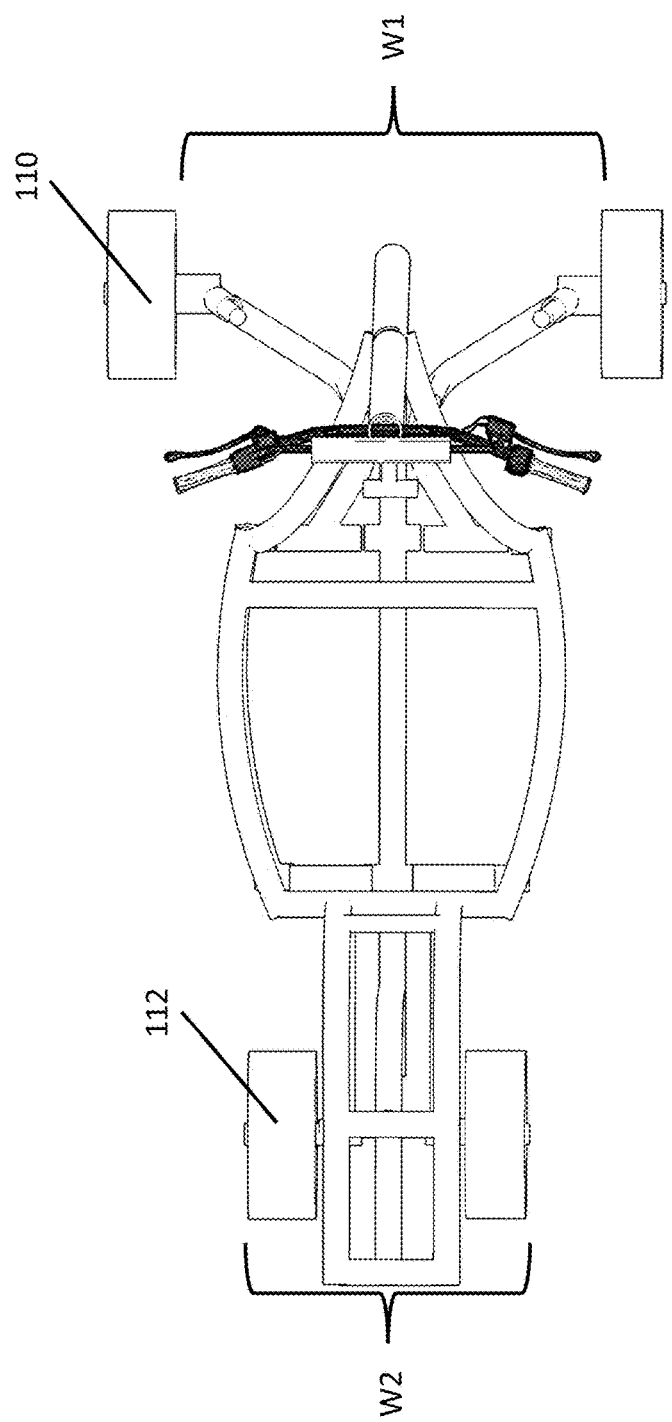
FIGS. 2-3 are top views of an embodiment of the utility vehicle of FIG. 1.
Figure 3:
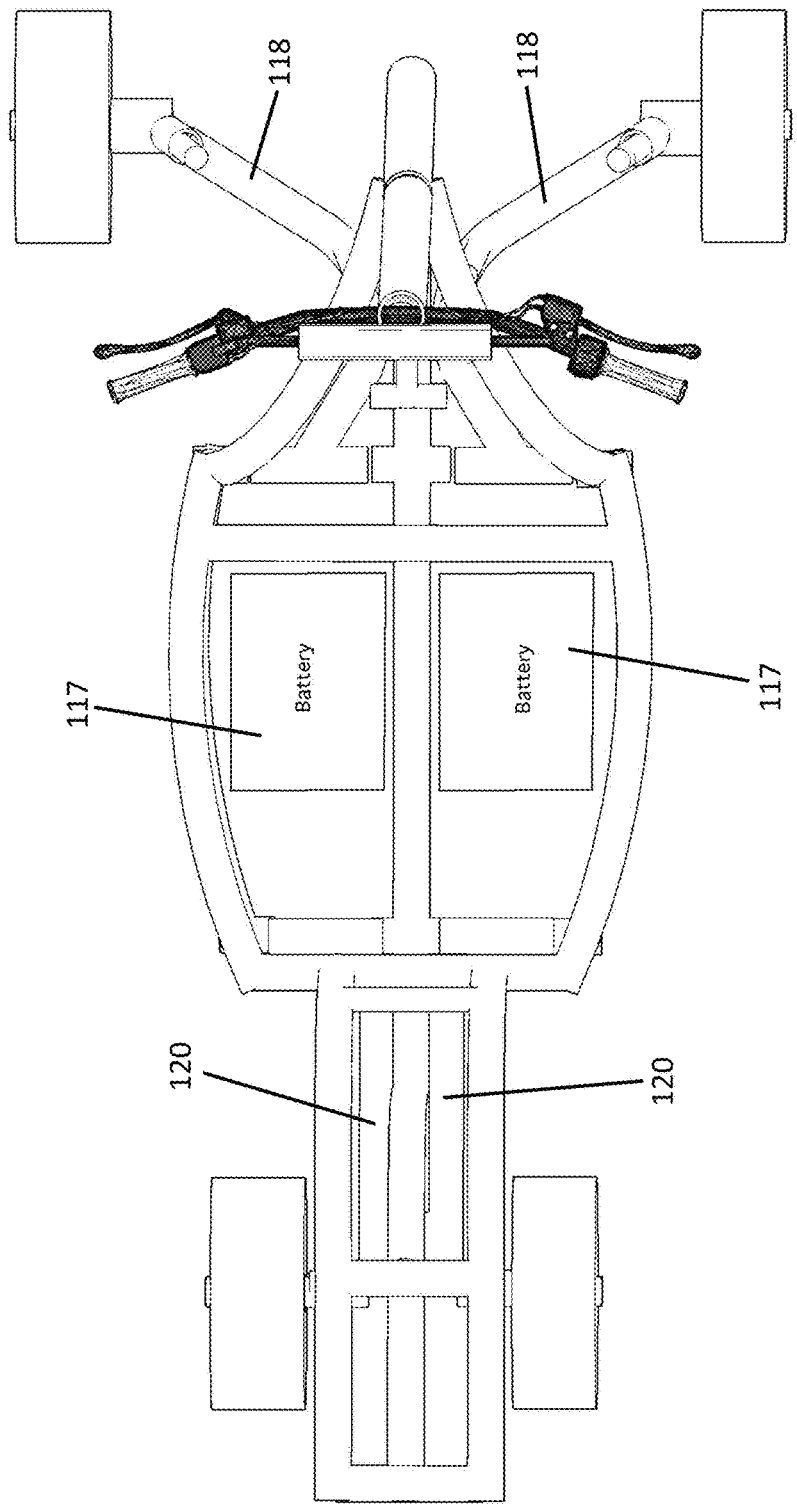

Referring to FIGS. 1-3 and also generally to FIGS. 4-33, a utility vehicle 100 is shown. The utility vehicle is configured for a single rider to drive the vehicle while in a standing position. Accommodations for a passenger can also be provided.

The utility vehicle 100 generally comprises a frame 102. The frame comprises a central portion 104 with a front independent suspension 106 pivotally coupled to a front end of the central portion 104 and an independent rear suspension 108 pivotally coupled to a rear end of the central portion 104. Each of a pair of front wheel hubs 110 are rotatably coupled to one of the front suspension arms 118 and each of a pair of rear wheel hubs 112 are rotatably coupled to one of the rear suspension arms 120. Front shocks 114 and rear shocks 116 are respectively coupled to the suspension arms 118 and 120 to dampen the pivoting movement of the arms to provide a cushioned ride to the user. Wheels and tires can be mounted to the wheel hubs 110 and 112.

The frame 102 can be formed from a combination of 1.0 inch steel tubing to 1.5 inch steel tubing. Other metals and composite materials can be alternatively used, and other sizes can be used as well.

Each of the wheel hubs 110 and 112 includes an integrated electric hub motor that provides motive power to the vehicle 100. Thus, there are no axles spanning between each pair of wheel hubs 110 and 112. The electric hub motors in one example are each 1500-watt motors. Motors of other power ratings can alternatively be provided.

The central portion 104 of the frame 102 defines a perimeter of an enclosable space that can house the power supply (e.g. batteries) for powering the motors. Two batteries 117 are shown in FIG. 3 in this enclosable space of the central portion 104. Providing two spaced-apart battery modules balances the weight laterally on either side of the longitudinal axis of the vehicle.

Platform and Foot Boards

Figure 34:
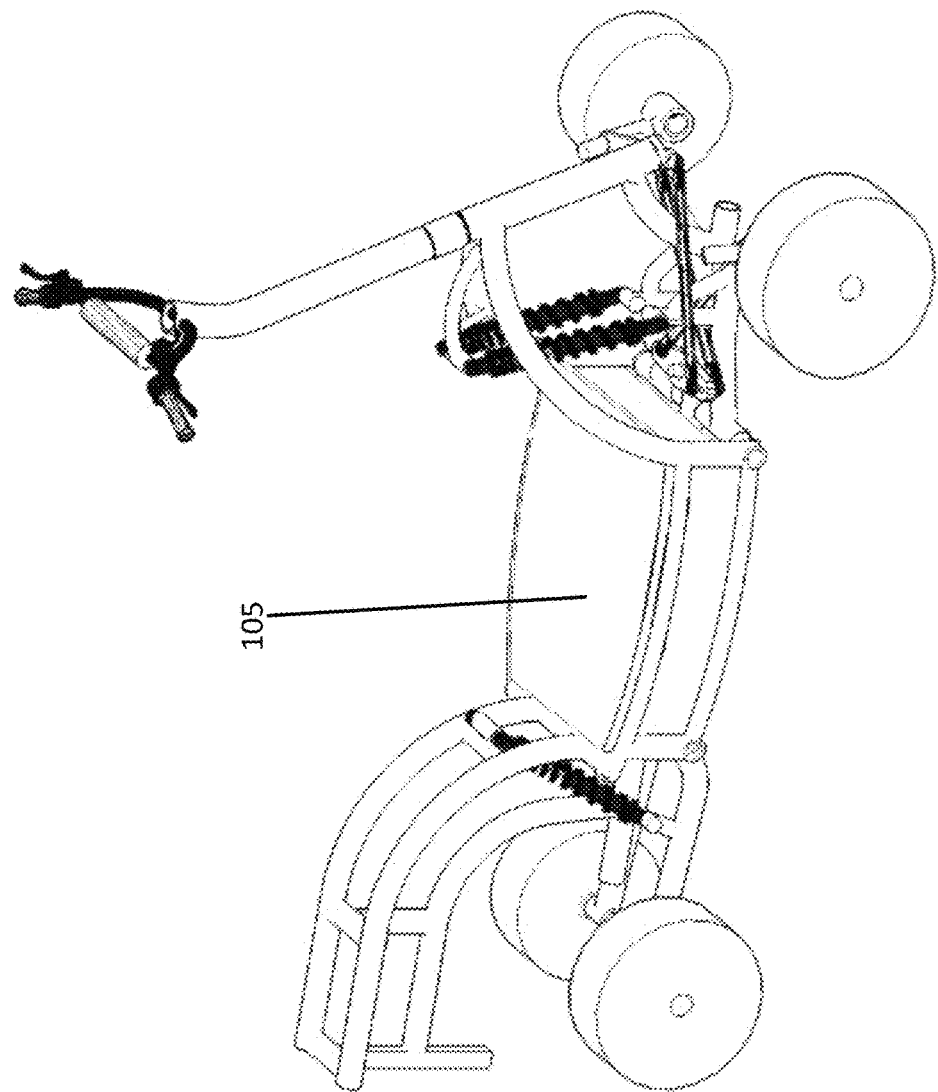
FIG. 34 is a perspective view of a utility vehicle in accordance with certain embodiments of the invention.

As can be seen in FIG. 34, a platform 105 on which the user stands may stand while operating the vehicle 100 is provided atop the central portion 104. The entire central portion 104 can be enclosed with panels provided to each side defined by the perimeter frame members.

Figure 37:
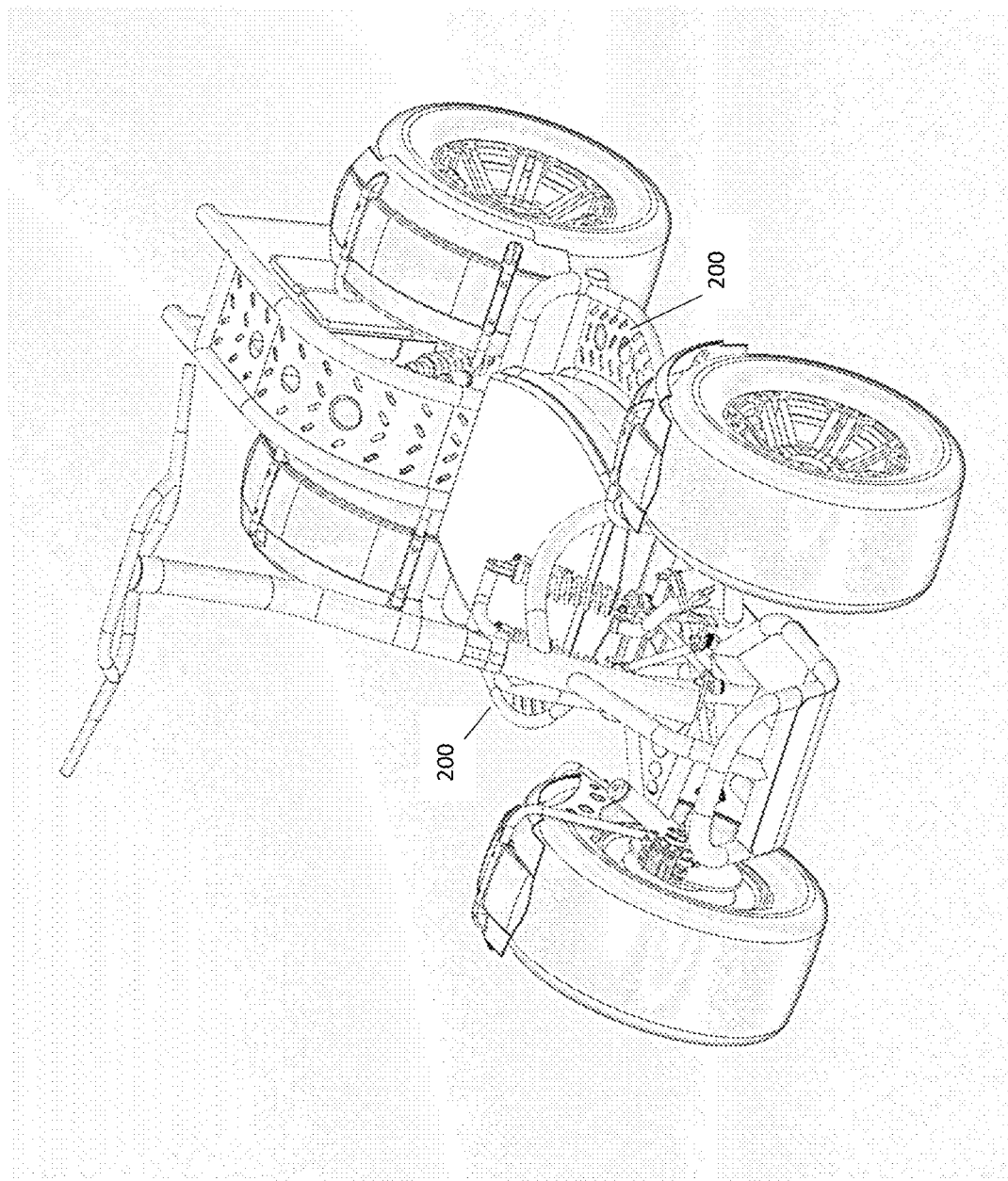
FIG. 37 is a perspective view of a utility vehicle in accordance with certain embodiments of the invention.

As can be seen in FIG. 37, foot boards 200 on which the user may stand while operating the vehicle 100 are provided. In one embodiment, the vehicle has foot boards which may be angled inward, meaning that the exterior edge of each floor board is higher than its interior edge nearest the vehicle.

Standing with a wide stance on a level surface or on foot boards on a vehicle increases the user's ability to quickly transfer the user's weight from one foot to the other which makes the vehicle able to respond quickly to lateral pitch changes in the environment and centrifugal forces due to cornering. This increased responsiveness is, known to improve rider and overall vehicle stability, and which is known to allow the rider to better brace against movement of the vehicle. However, standing with a wide stance on a level surface on a vehicle may cause supination of the rider's ankle, placing additional stress onto the ankle and reducing the rider's stability, control and comfort. Additional stress on the supinated ankle may result from unanticipated movement of the vehicle in every axis (such as when travelling over uneven terrain), from bracing with a supinated ankle against desired acceleration, deceleration or cornering, or from bracing against a fall or impact.

Standing with a narrow stance on a level surface reduces or eliminates ankle supination, but also reduces overall vehicle stability as the center of mass of the rider is raised. Additionally, a narrow stance reduces the rider's ability to brace against movement or impact.

The angled foot boards on the vehicle reduce or eliminate ankle supination, thereby reducing stress on the rider's ankle. This reduced stress allows the rider to more comfortably adopt a wider stance, providing the benefits of a wider stance with reduced or eliminated ankle stress.

Figure 38:
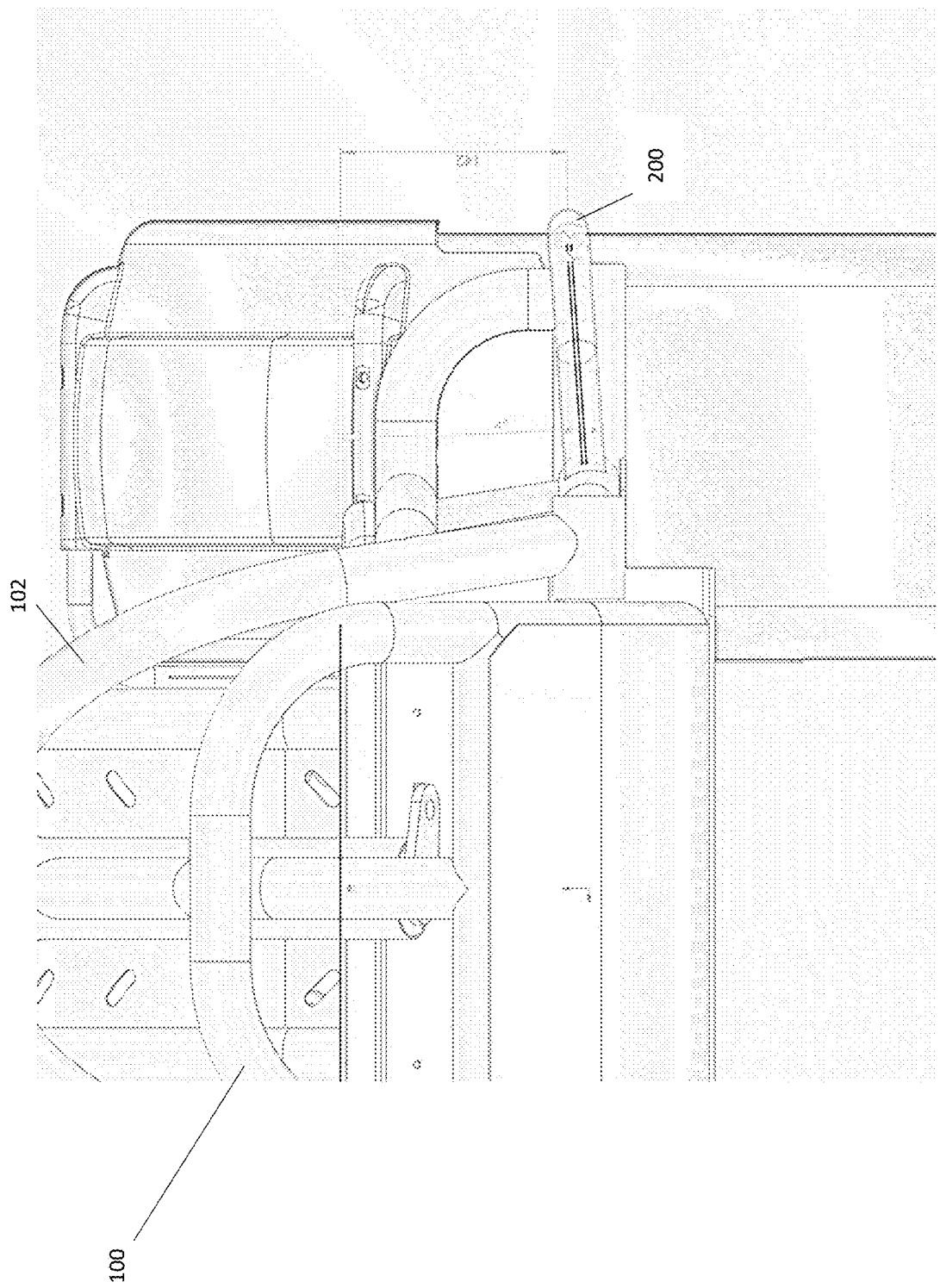
FIG. 38 is a section view of a utility vehicle in accordance with certain embodiments of the invention.

In one embodiment, as shown in FIG. 38, the foot boards 200 are fixedly attached to the vehicle 100 and are angled at 4 degrees to the plane of the floorboard of the vehicle. The angle of 4 degrees is chosen through experimentation as an optimal value.

In a straight-legged standing position with legs spread, the floor board would be tilted to be normal to the axis of the rider's leg, to support the rider without any constant torque in the ankle, which torque may cause fatigue and may make the rider more prone to injury. For a rider of average height, this foot board angle may be approximately 11 degrees.

As well, riders typically bend their knees to absorb shock and vibration and to provide greater stability over rough terrain or while cornering. With bent knees, a rider of average height may require foot boards angled at approximately 5 degrees for the foot boards to be normal to the axis of the rider's lower leg.

In practice, the floor board angle should be less than this angle, as the rider will be leaning in one direction or the other, and the rider's weight will be placed onto the foot in the direction of the lean. When the rider leans, the leg angle is reduced, meaning that in a lean, the normal to the axis of the leg is provided by a lower angle on the foot board.

Through experimentation, the optimal value for the angle of the floor board has been found to be 4 degrees. However, benefit may be obtained from an angle as low as 2 degrees or as high as 12 degrees.

In one embodiment, the angle may be between 2 degrees and 12 degrees to the plane of the floorboard of the vehicle.

In one embodiment, the foot boards may be rotatably attached to the vehicle so as to enable the foot board angle to be changed. Optionally, the foot board attachment may be a locking attachment so as to prevent the foot board from changing angle during vehicle operation. Optionally, the foot board attachment may be non-locking so as to allow the angle to change during vehicle operation.

In one embodiment, additional angled boards may be optionally attached to the foot boards, to increase the angle for shorter riders.

Optionally, the foot board may dynamically or passively change angle during cornering to better support the foot. In one embodiment, an onboard computer may sense the forward speed of the vehicle as well as the angle of steering, and based on these may cause a signal to be sent to a piston or motor attached to the foot board, which signal causes the piston or motor to change the angle of the foot board such that the new angle of the foot board is closer to the normal of the axis of the rider's lower leg. In one embodiment, the onboard computer may cause this signal to be sent based on inertial measurements, user settings, camera-based or weight-based monitoring of the rider's position, the vehicle's speed, the angle of steering or some combination of these factors.

It will be understood that the foot boards may be attached directly to the frame of the vehicle, to the exterior body of the vehicle or to a separate member which is itself attached to the frame or the exterior body of the vehicle.

Track Width Offset

The track width of a pair of wheels on a single axle of a vehicle may be defined as the distance from the outer wheel hub on one wheel on the axle to the outer wheel hub on the other wheel on the same axle. The outer edge of the tire tread is presumed to mark the location of the outer wheel hub; however, in some designs the outer wheel hub may be inset or may otherwise deviate from the outer edge of the tire tread.

On four-wheeled vehicles, it is known and common for the front axle's track width to be narrower than the rear axle's track width, to allow for greater maneuverability of the vehicle. It is also known and common for the track width to be the same on front and rear axles.

In one aspect, the vehicle has a wider track width on the front axle than on the rear axle. A wide track width on the front axle improves the braking stability of the vehicle by providing a wider stance to support the braking force of the vehicle.

In one embodiment, the track width difference is equal to or greater than double the tread width of the front tires. With such an arrangement, the rear tires generally do not travel in the tracks created by the front tires, creating better traction by allowing the rear tire treads to catch terrain which has not been compacted or shaped by the front tires.

In one embodiment, the track width difference is less than double the tread width of the front tires. Such an arrangement may balance the manufacturing ease and maneuverability of an equal track width axle arrangement while retaining some of the benefit of a wide front track width arrangement.

As can be seen in FIGS. 2-3, the track width or lateral spacing dimension between the front wheel hubs 110 is greater than the track width of the rear wheel hubs 112. The front track width is sufficiently greater than the rear track such that the inner width W1 between the insides of the front wheel hubs 110 is greater than the outer width W2 of the rear wheel hubs 112 (see FIG. 2).

In one example, the track width of the front wheel hubs 110 is 10 inches greater than the track width of the rear wheel hubs 112. This is provided by varying the relative width dimensions of the front suspension arms 118 as compared to the rear suspension arms 120. In one example, the widths of the suspension arms at the points where the hubs are mounted are: front 32.5 inches and rear 22.5 inches.

Since the inner width W1 between the insides of the front wheel hubs 110 is greater than the outer width W2 of the rear wheel hubs 112, the utility vehicle enjoys at least several benefits. For example, the relatively wider front width makes for a more stable operation. In other words, the vehicle is less likely to tip over on side hills and when cornering as compared to track widths that are not significantly wider in front. The offset configuration of widths also provides better traction in off road terrain because the tire on each wheel has its own unique ground to cover. The rear tires do not travel in ruts created by the front tires. Relatively tighter turns can also be accomplished while a trailer is attached.

Also, if a rider dismounts the vehicle while coming to a rolling stop, the rear wheels and/or tires cannot strike them because the wheels/tires can be tucked inward with respect to the width of the frame 102. This tucked-in configuration further protects the rear wheels and ties from tree branches and rock outcroppings. For indoor warehouse applications, the tucked-in configuration eliminates the possibility of the rear wheels and tires catching on shelving corners or pallets.

A hitch receiver can be provided to a vertical member 144 of a rear section 146 of the frame 102 so that a trailer towing hitch or other hitch receiver accessory can be coupled to the utility vehicle 100. The hitch receiver can be adjusted for vertical height along the vertical member 144.

Suspension and Steering

Figure 4:
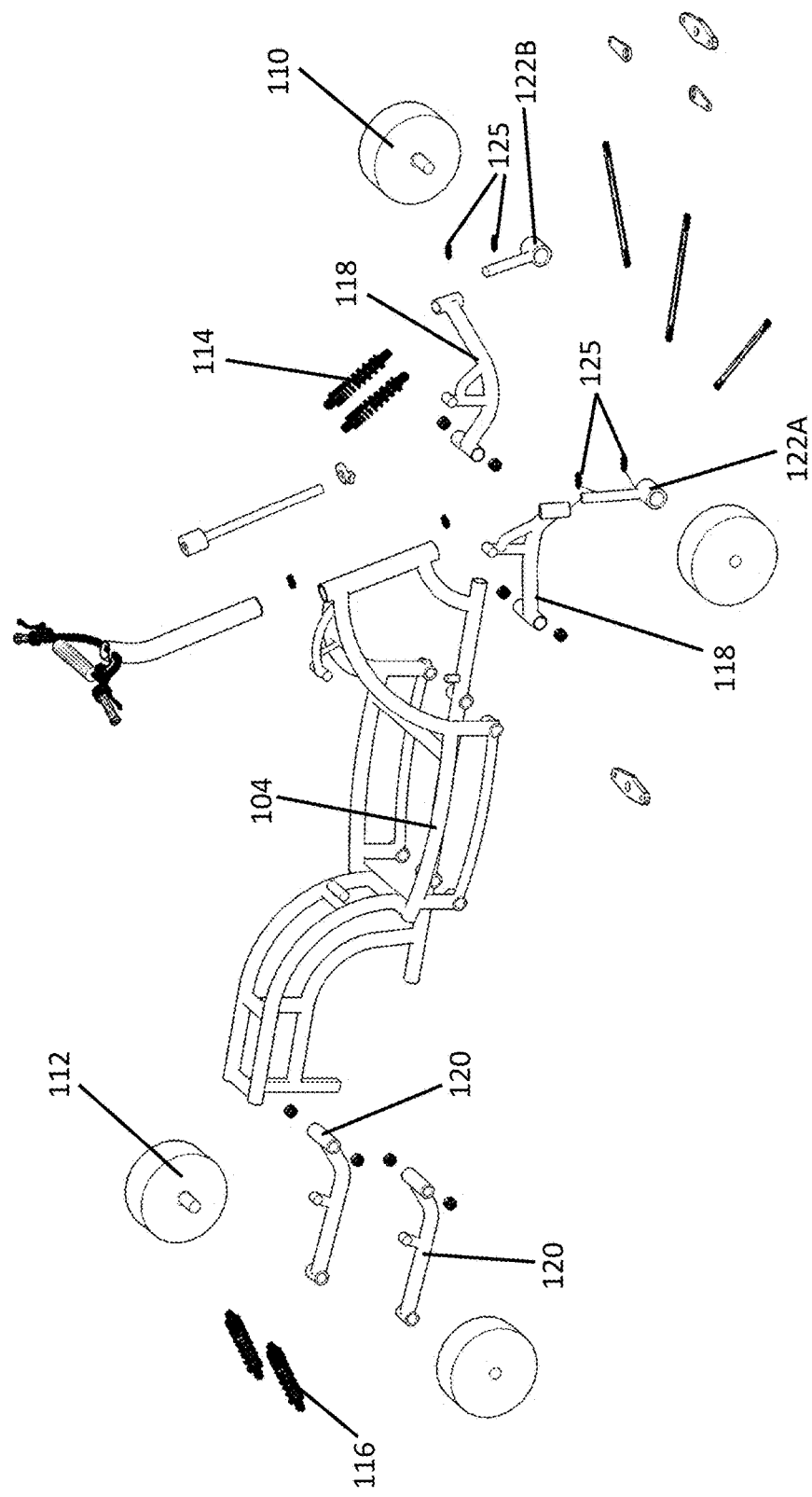
FIGS. 4-33 are exploded perspective views of an embodiment of the utility vehicle of FIG. 1.

Referring now to FIGS. 4-33, assembly and other configuration details will now be discussed and illustrated. FIG. 4 is an exploded view showing various components of the utility vehicle 100.

The front suspension 106 includes a pair of independent front suspension arms 118. These are forward-facing swing arms that are pivotally mounted to a forward member of the central portion 104. The rear suspension 108 includes a pair of independent rear suspension arms 120. These are rear-facing swing arms that are pivotally mounted to a rear member of the central portion 104. This configuration has fewer moving parts than a typical "A" arm suspension.

Figure 5:
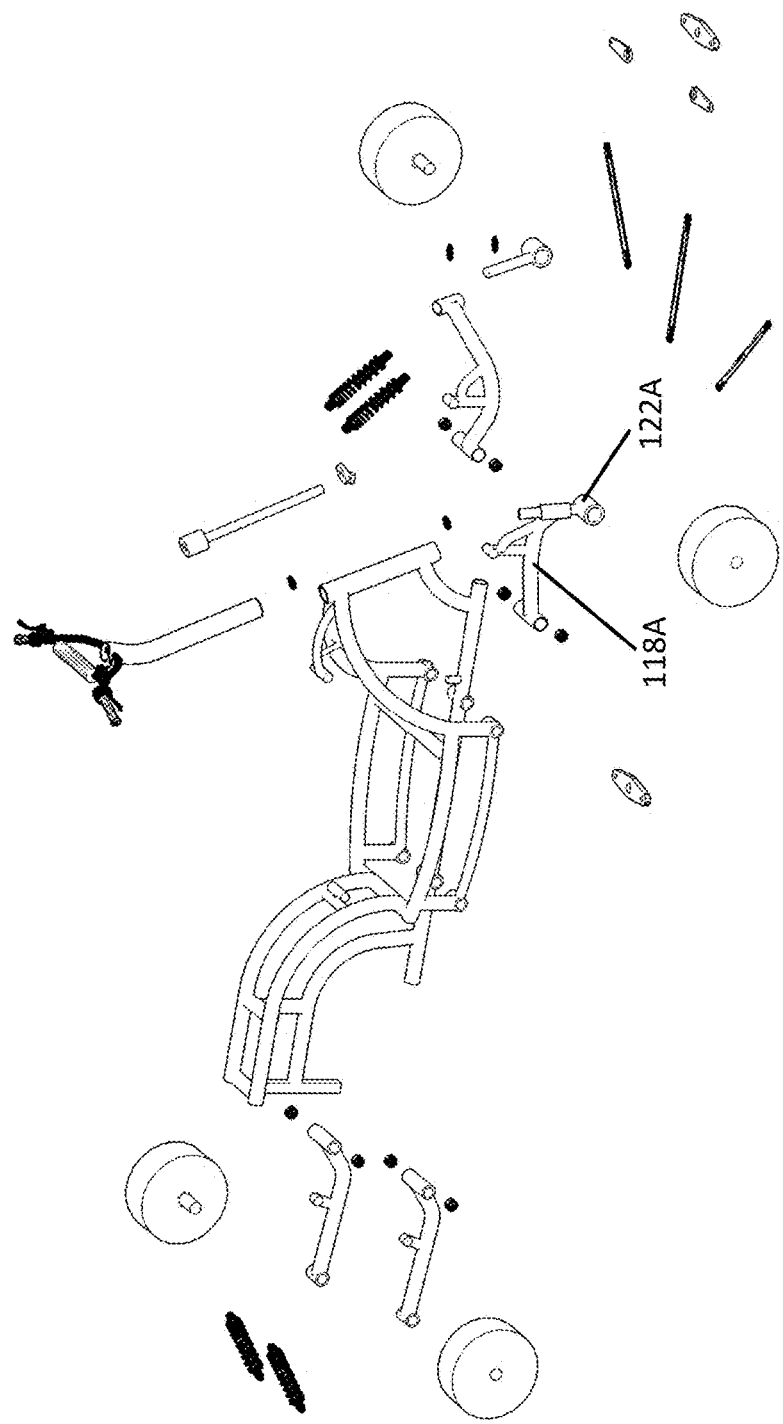
Figure 6:
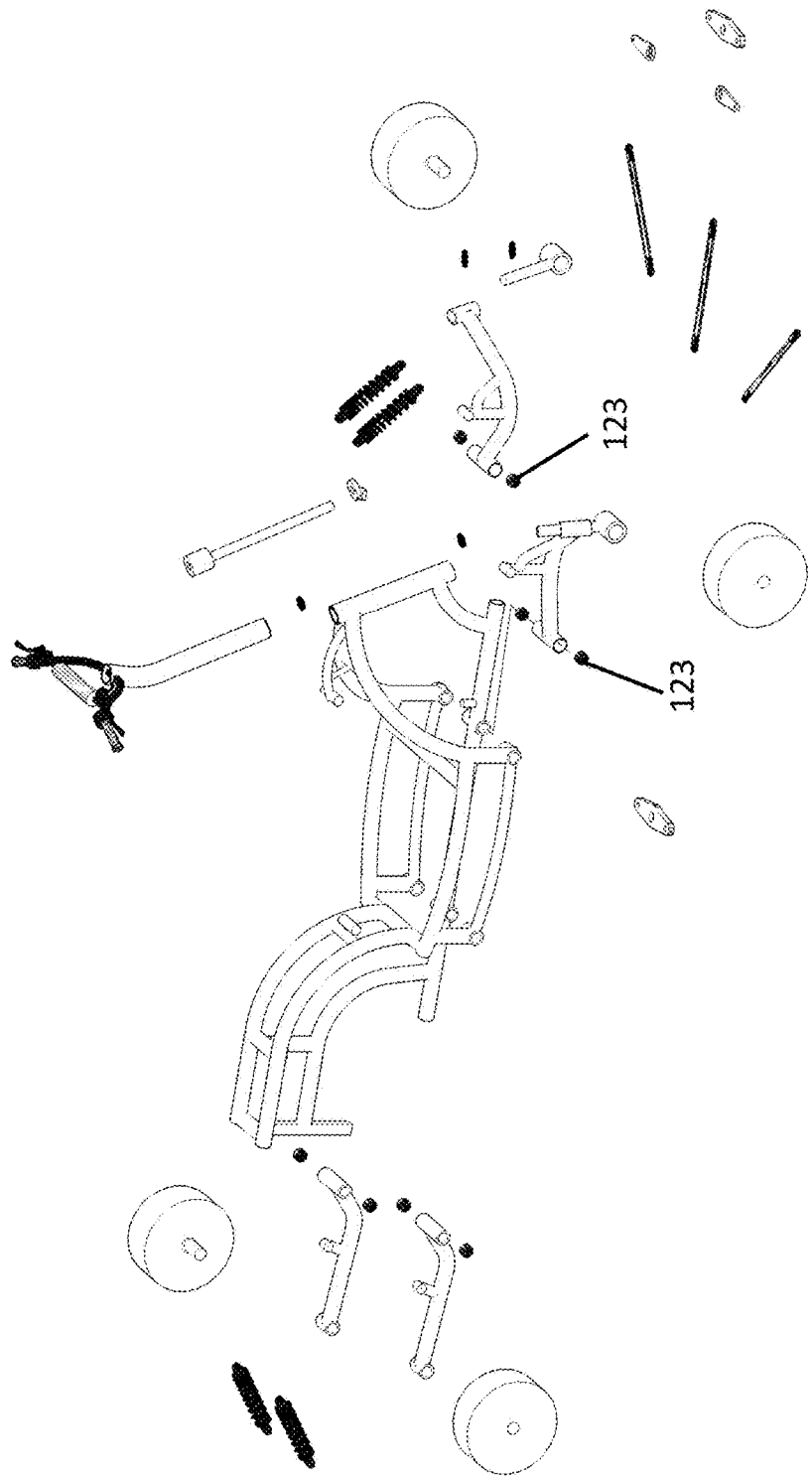
Figure 7:
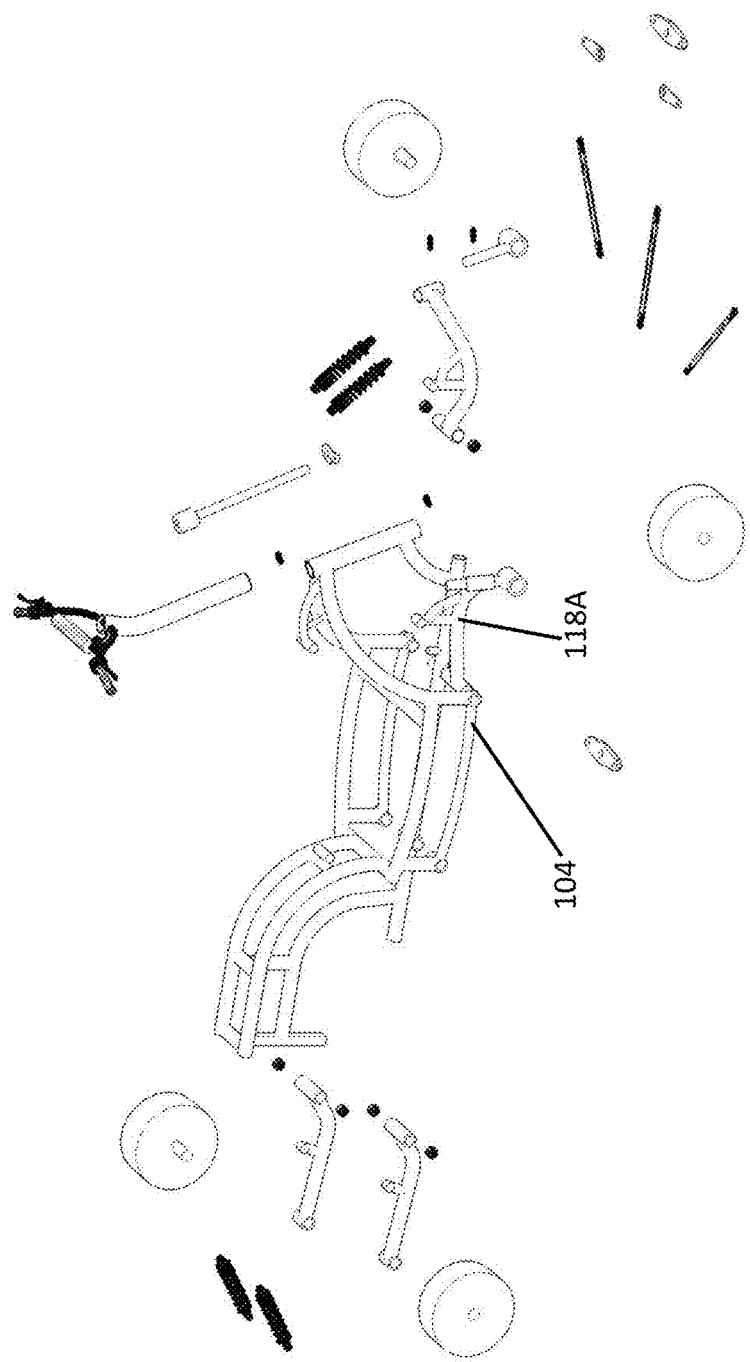
Figure 8:
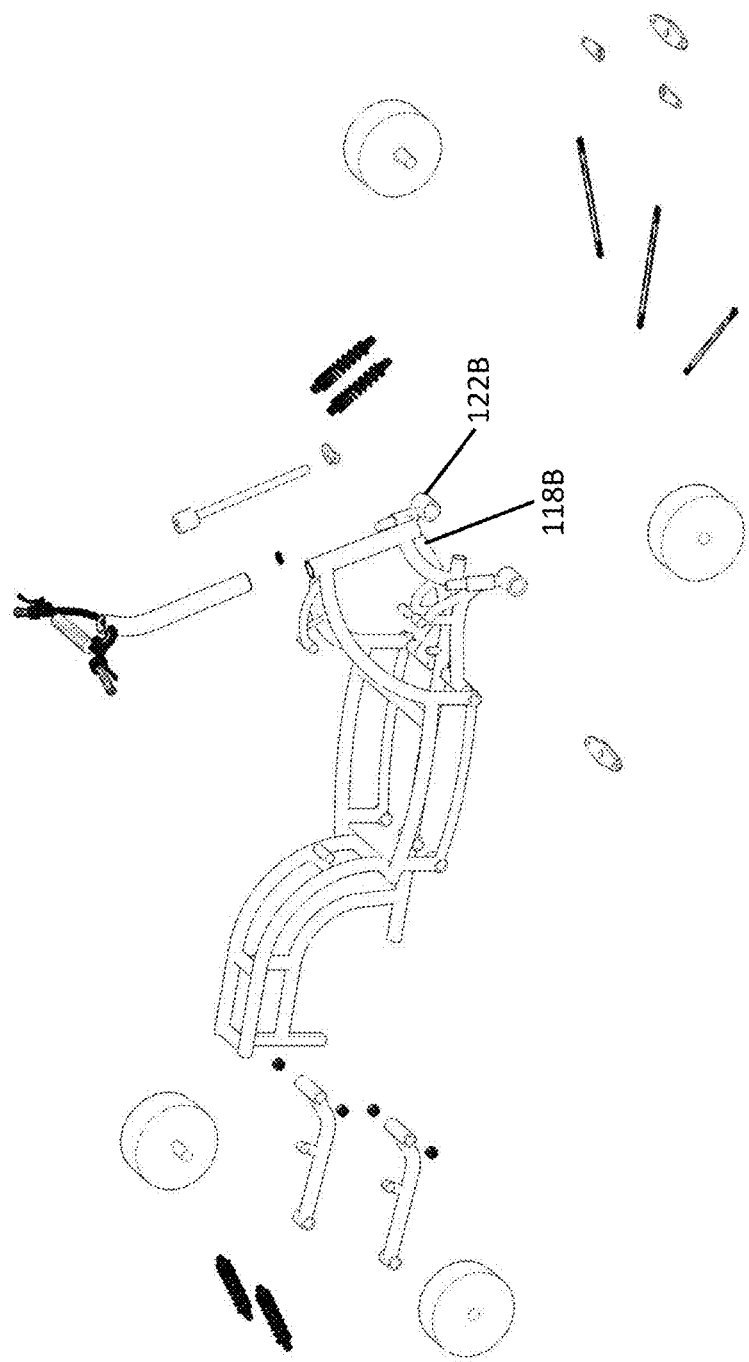
Figure 9:
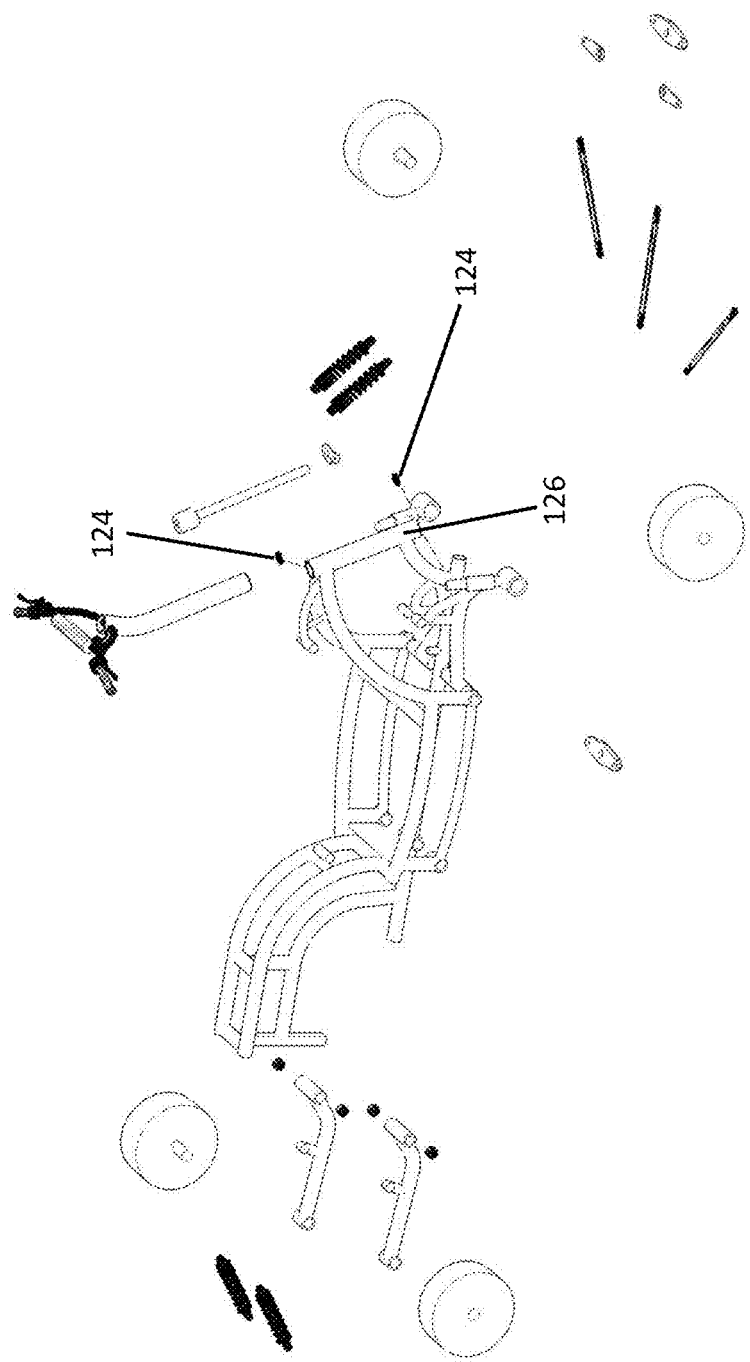
Figure 10:
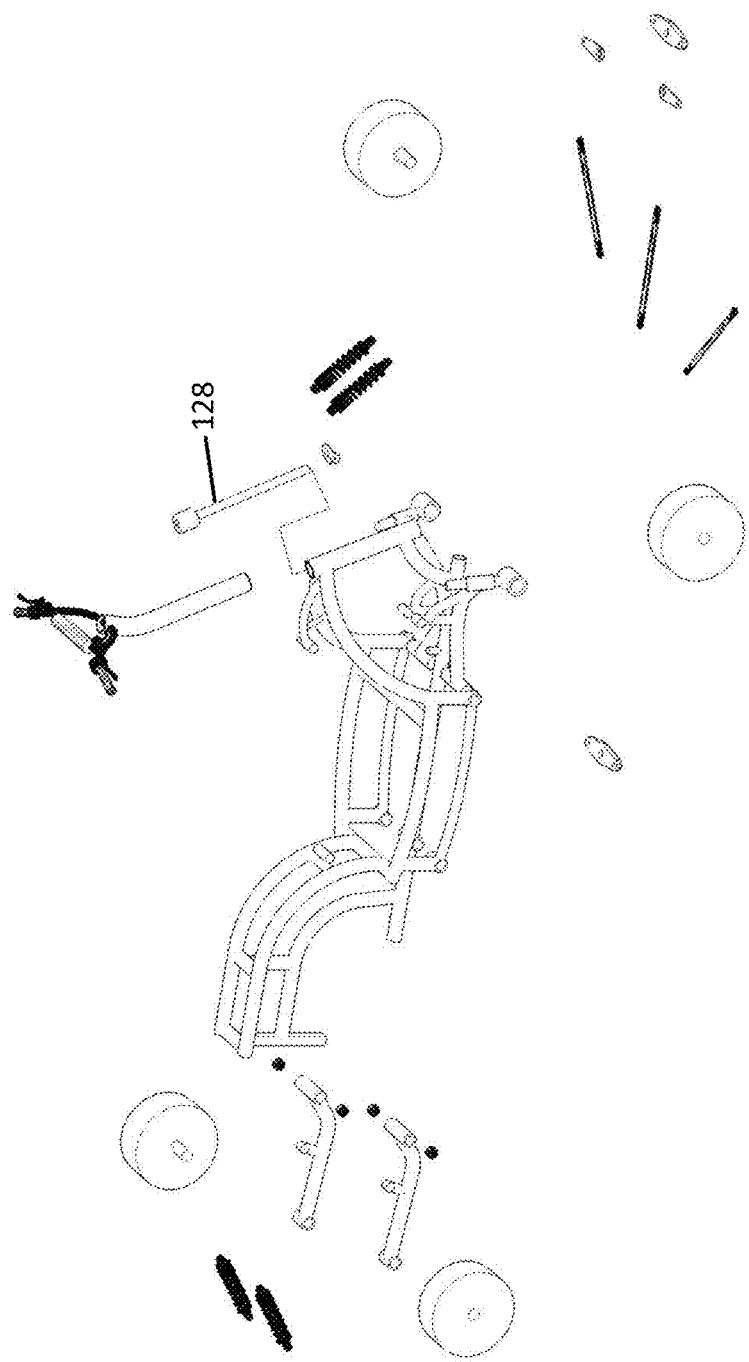
Figure 11:
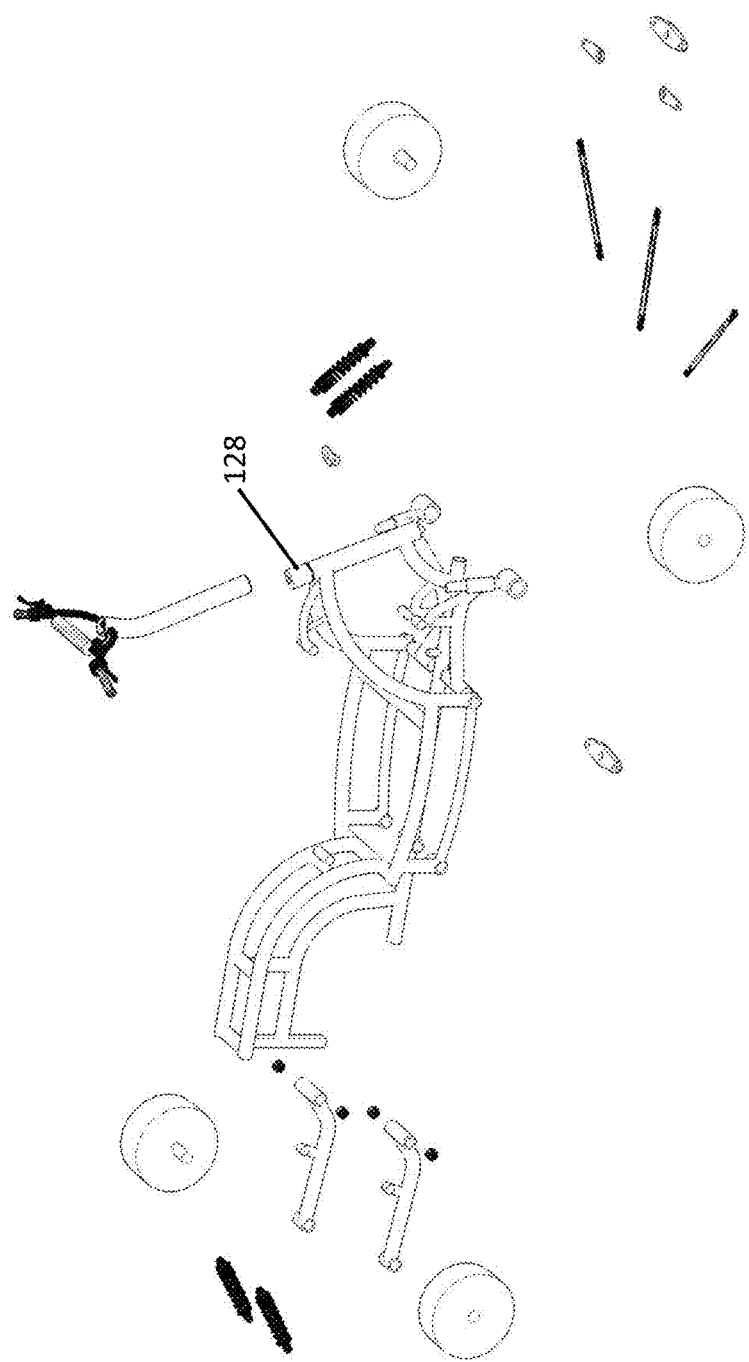
Figure 12:
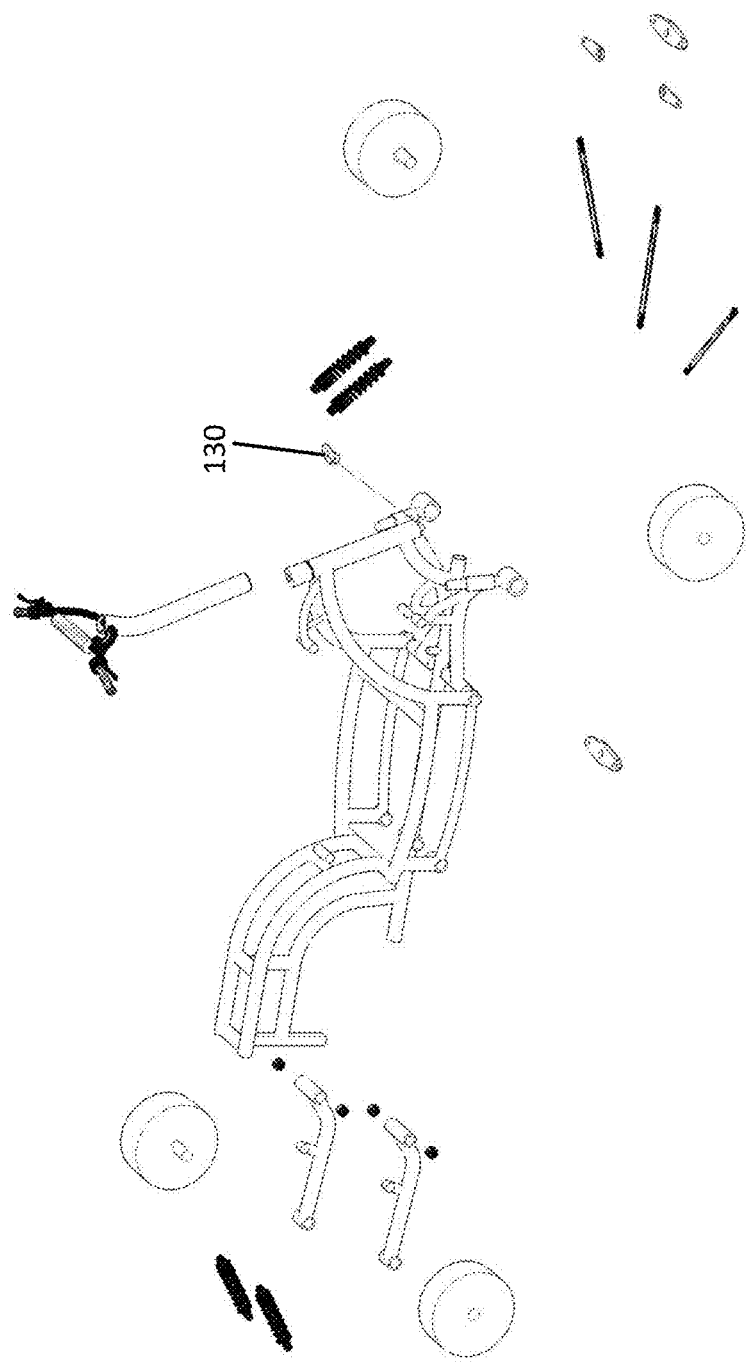
Figure 13:
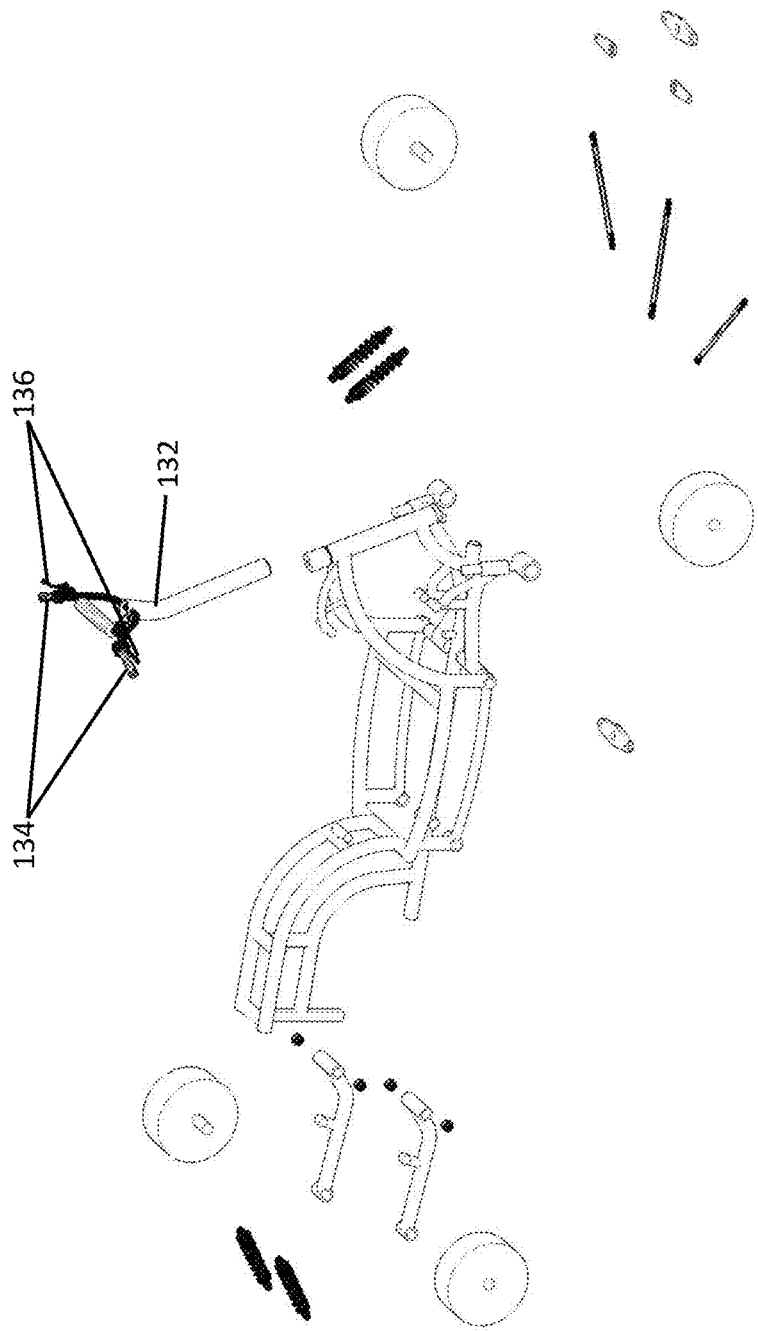
Figure 14:
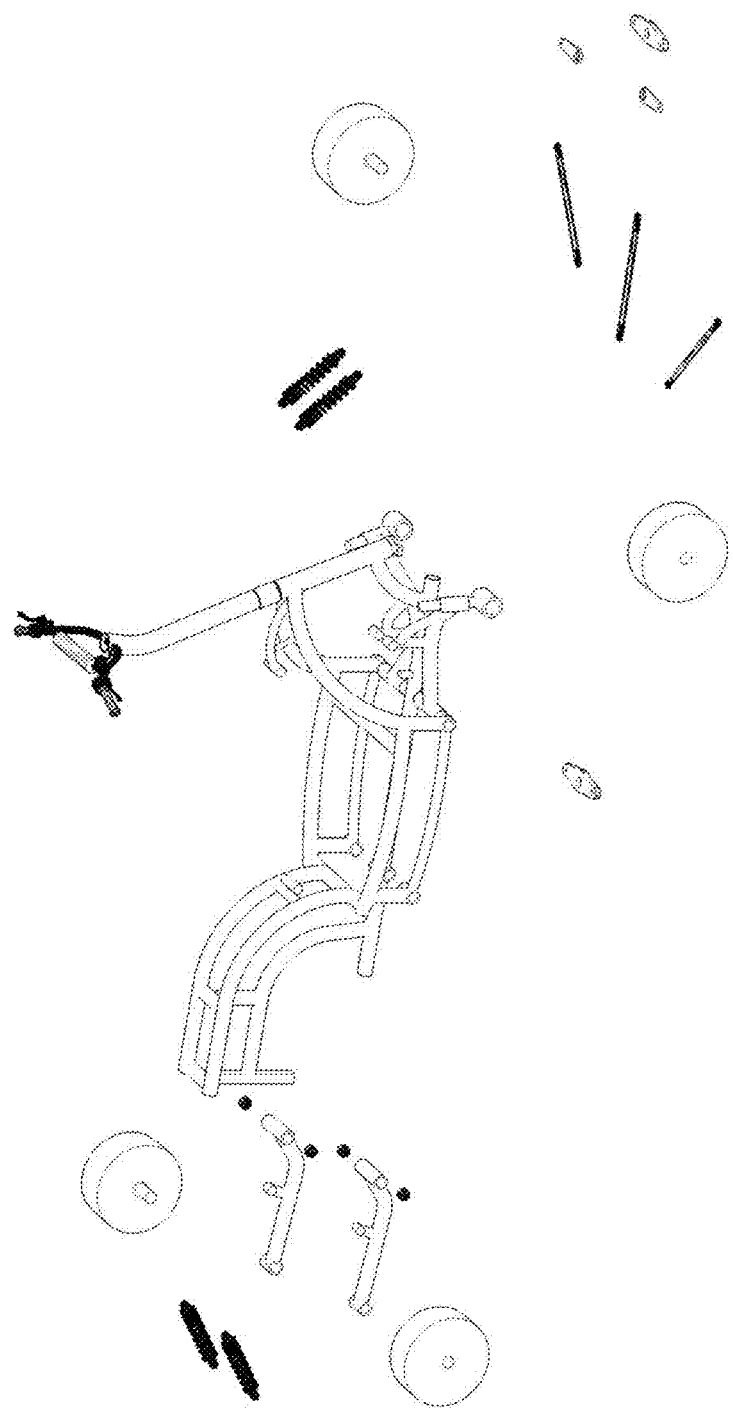

FIG. 5 shows the right steering knuckle 122A inserted into the right front suspension arm 118A. FIGS. 6-7 show mounting the right steering knuckle 122A and right front suspension arm 118A to the central portion 104 of the frame. FIG. 8 shows the left steering knuckle 122B inserted into the left front suspension arm 118B and mounted to the central portion 104 of the frame.

Sealed roller bearings 123 can be disposed between the suspension arms 118 and frame portions as illustrated. Thrust bearings 125 can be provided to the steering knuckles 122 as illustrated. In an alternate embodiment, in place of roller bearings 123 or thrust bearings 125, bushings may be used.

FIGS. 9-14 illustrate assembly of the steering components. A pair of tapered roller bearings 124 or, alternatively, appropriately chosen bushings, are disposed in the top and bottom, respectively of the tubular neck 126 provided to the front of the central portion 104. Next, the steering shaft 128 is inserted through the shaft from the top side of the neck 126. A Pitman arm 130 is attached to the lower protruding end of the steering shaft 128. The handlebar assembly 132 is next secured to the top end of the steering shaft 128.

The handlebar assembly 132 generally resembles a bicycle or motorcycle handlebar. Opposing handle grips 134 are provided with front/rear brake actuators 136. On the right handlebar next to the right grip is a thumb controlled throttle lever. The throttle lever communicates the user's input to a motor control unit (not shown) disposed inside of the central portion 104, which in turn selectively actuates the drive motors to drive or brake the vehicle 100. The motor control unit can include, for example, two or four motor controllers, which allows the front/rear or all four wheel hub motors to be operated independently.

Figure 15:
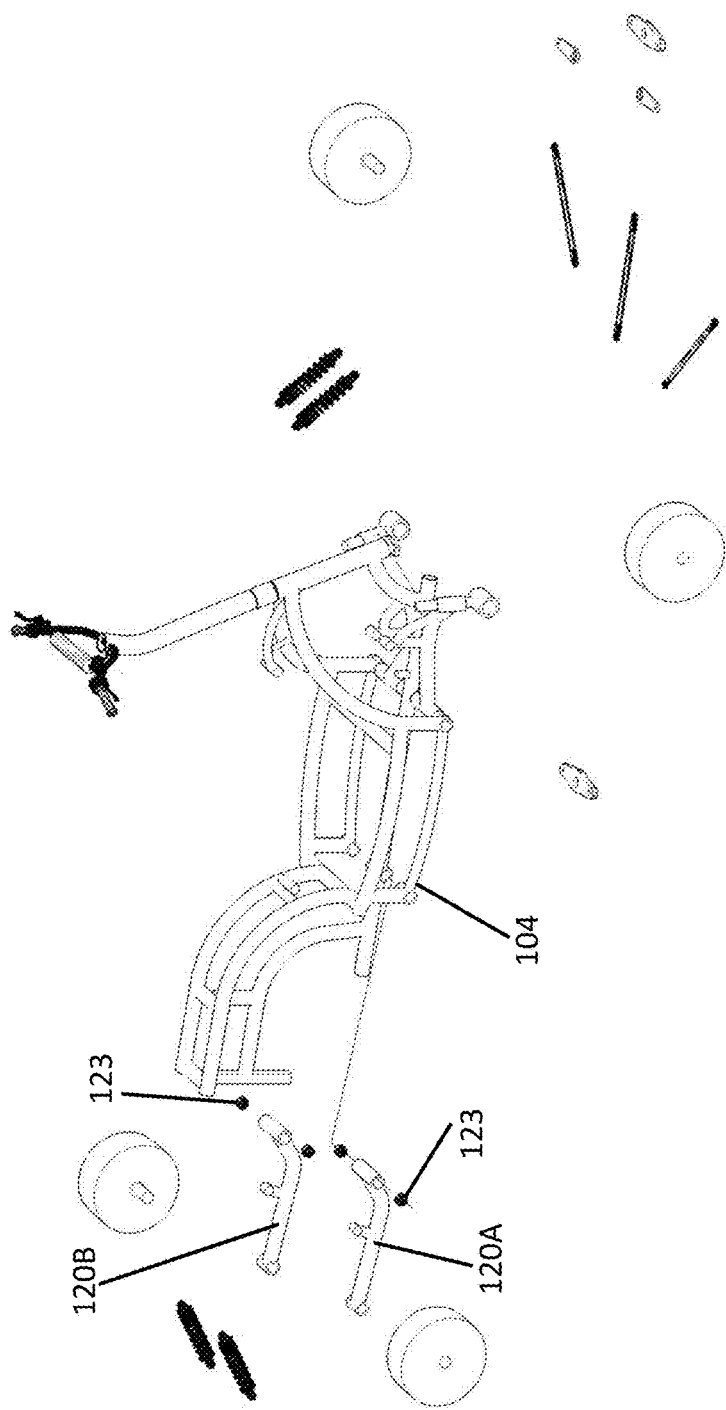
Figure 16:
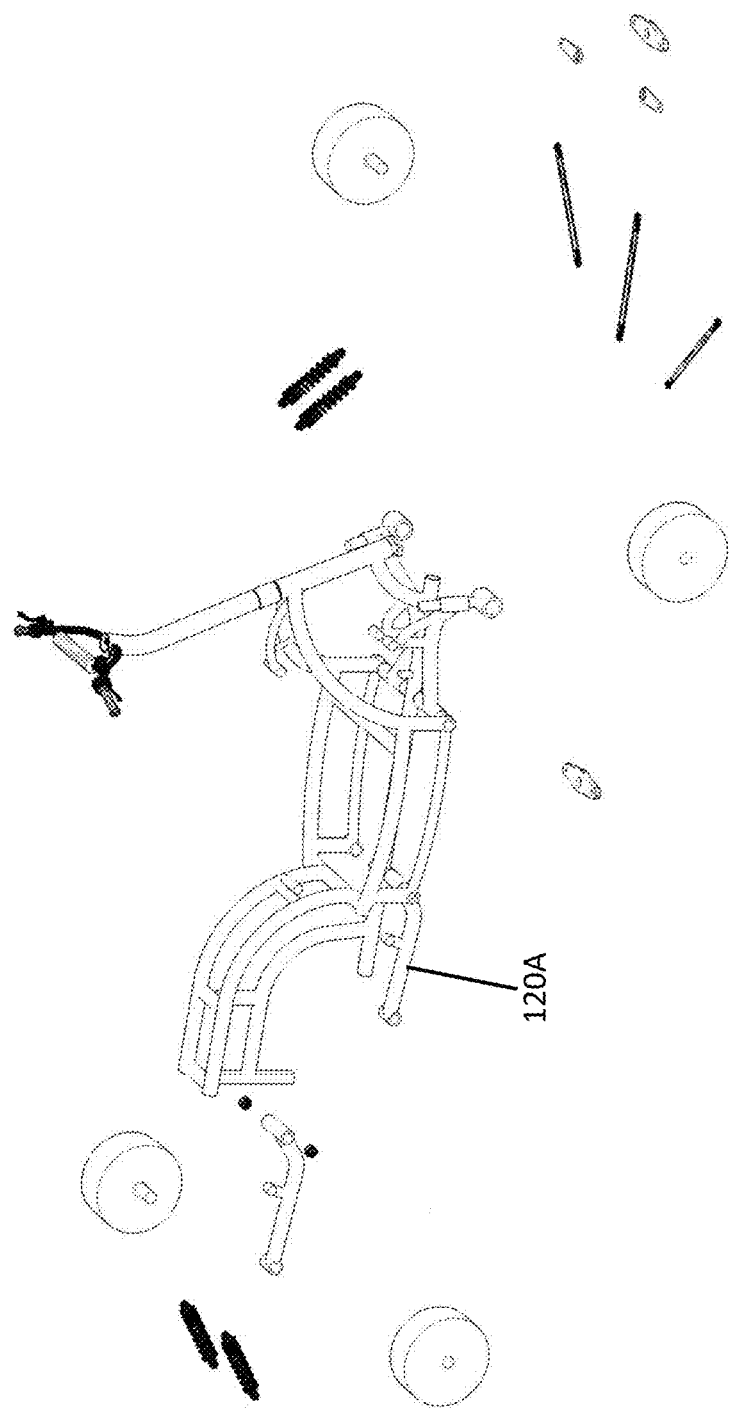
Figure 17:
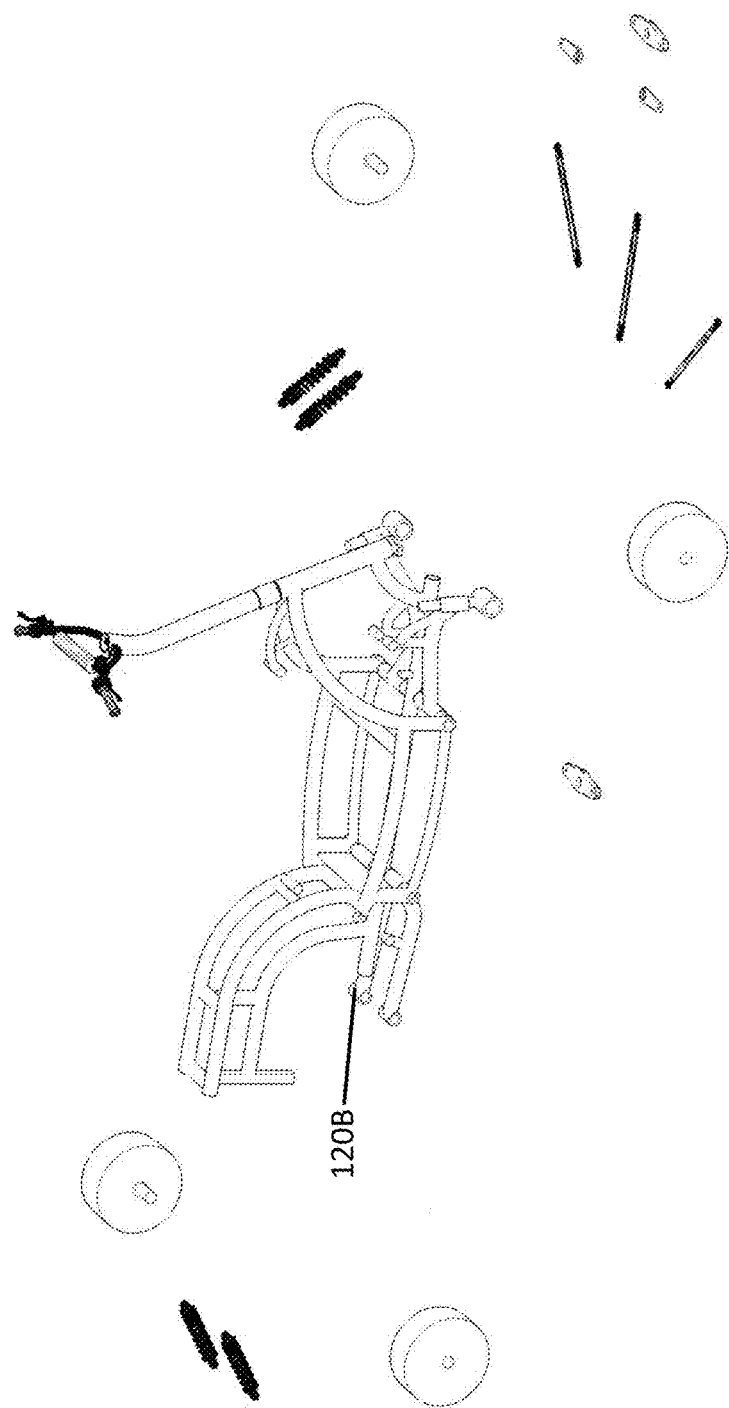

FIGS. 15-17 illustrate the attachment of the rear suspension arms 120A and 120B to the central portion 104 of the frame. Again, sealed roller bearings 123 or bushings can be disposed between the suspension arms 120 and frame portions as illustrated.

Figure 18:
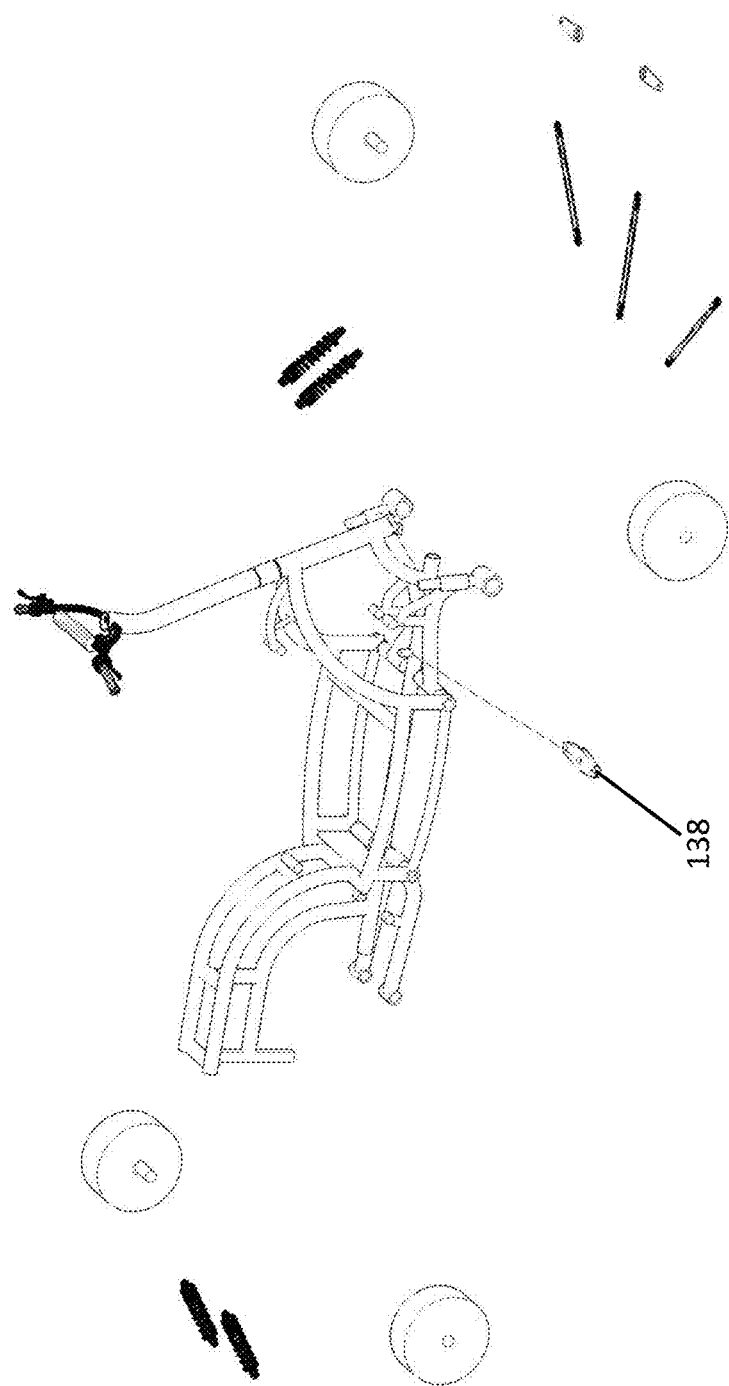
Figure 19:
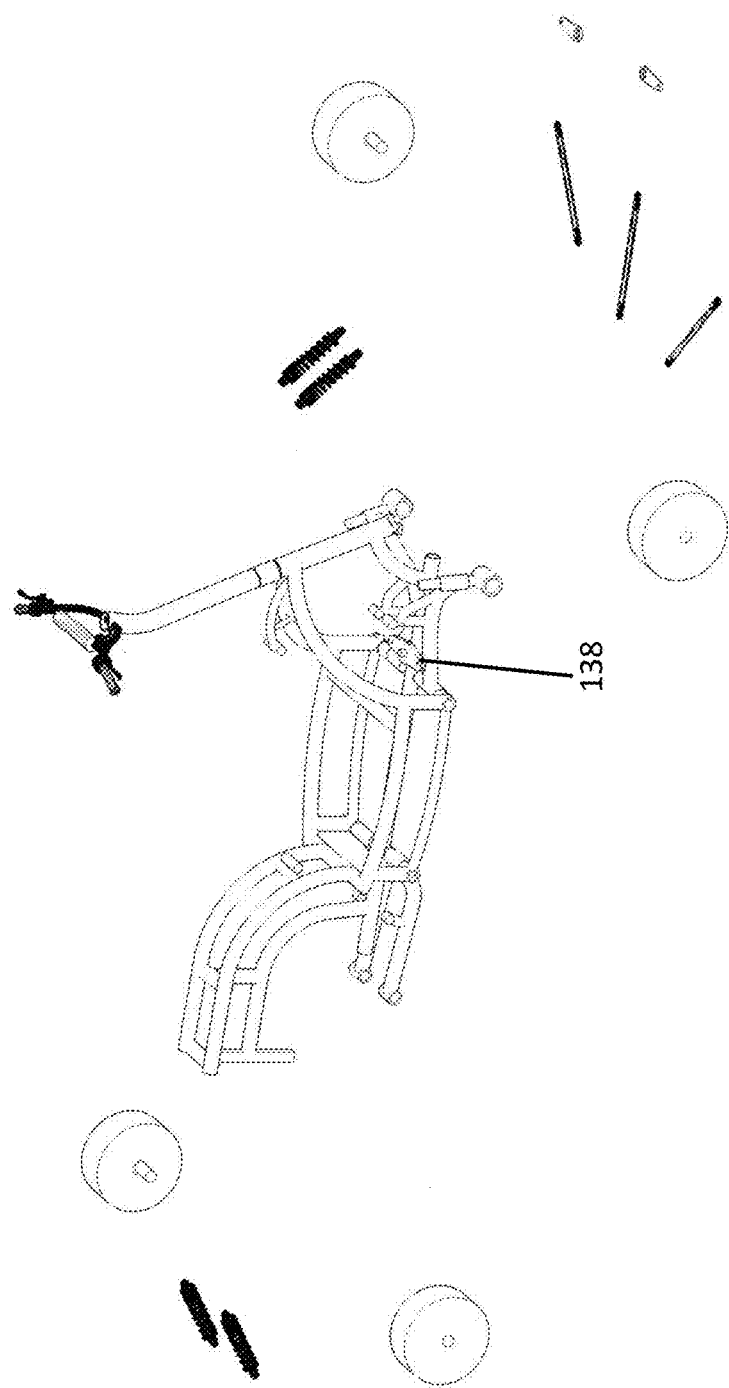

FIGS. 18-19 show the primary steering arm 138 pivotally mounted to the central portion 104 of the frame 102.

Figure 20:
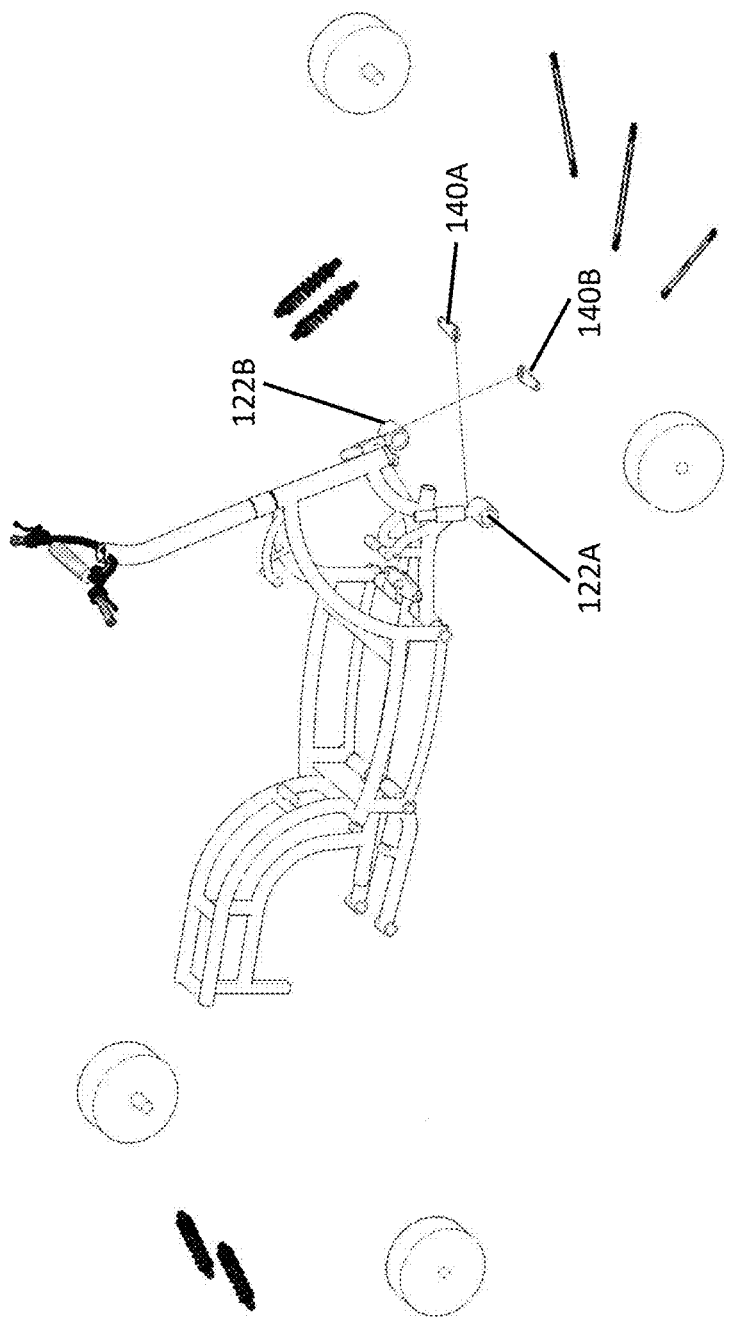
Figure 21:
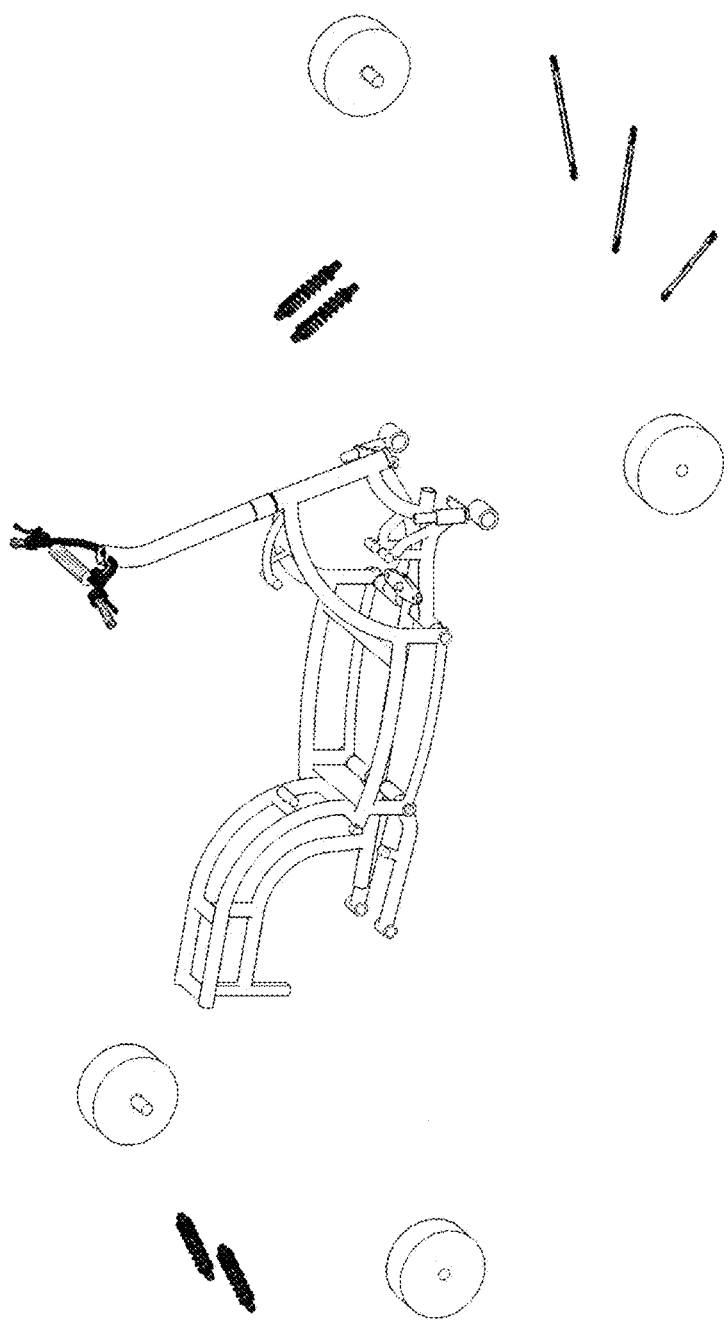
Figure 22:
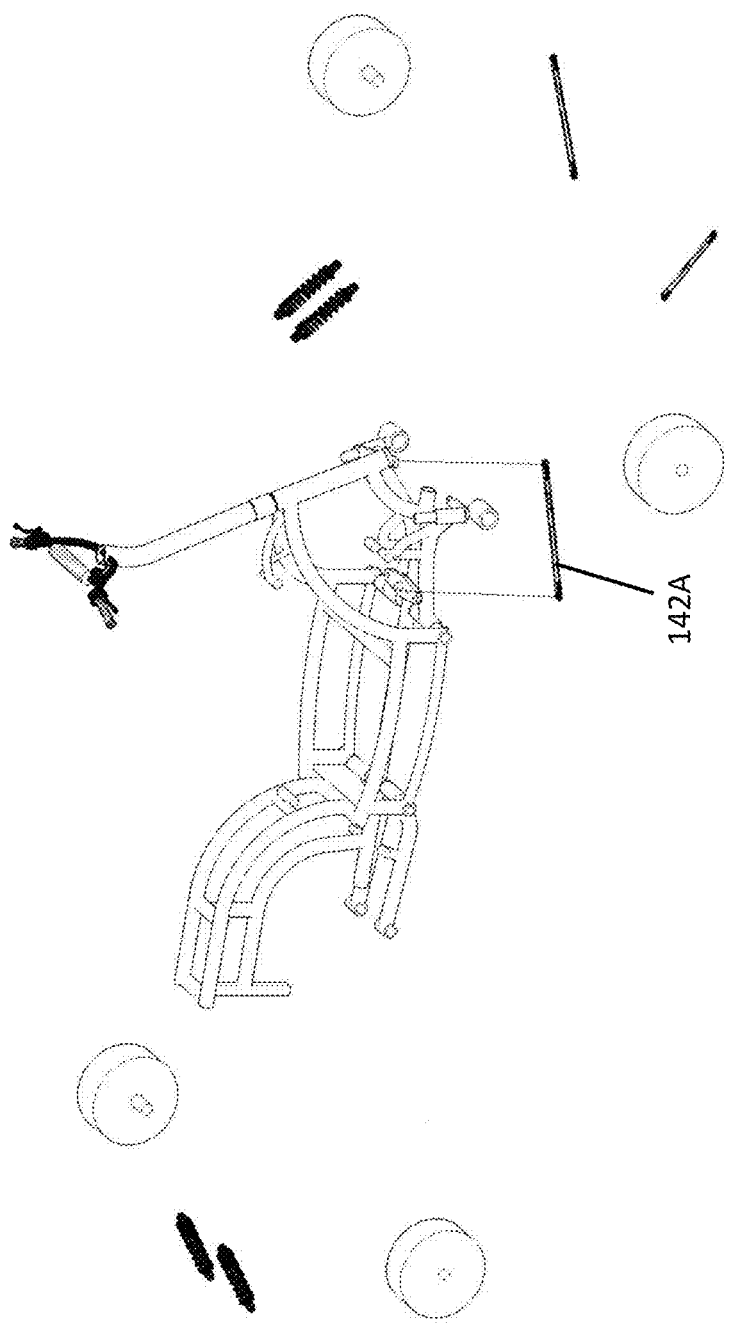
Figure 23:
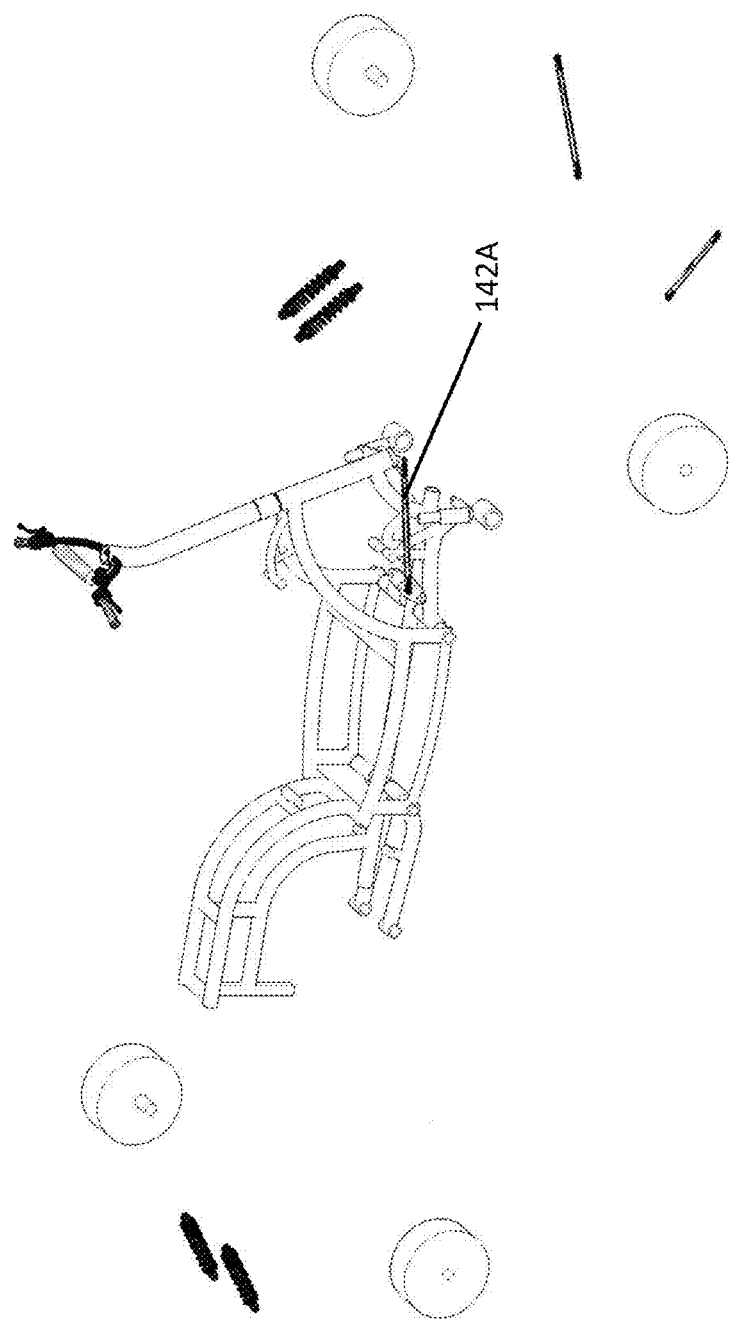
Figure 24:
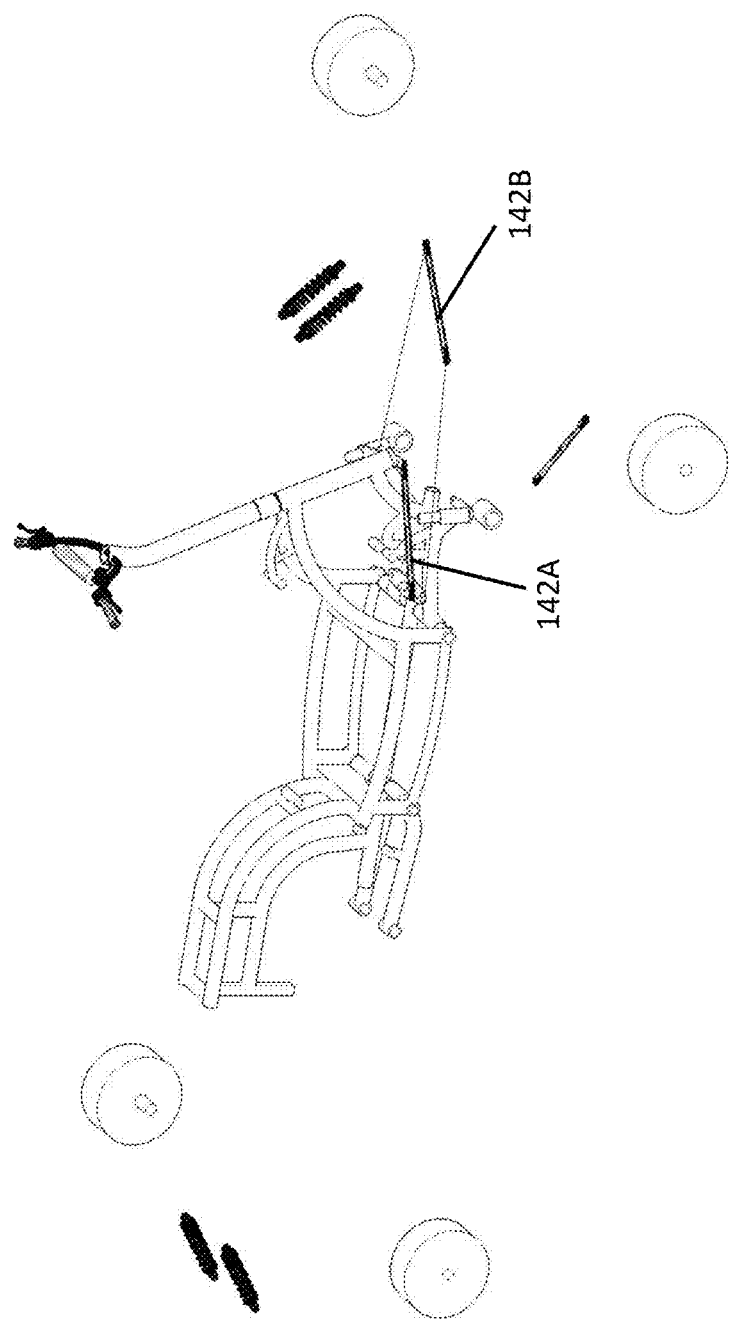
Figure 25:
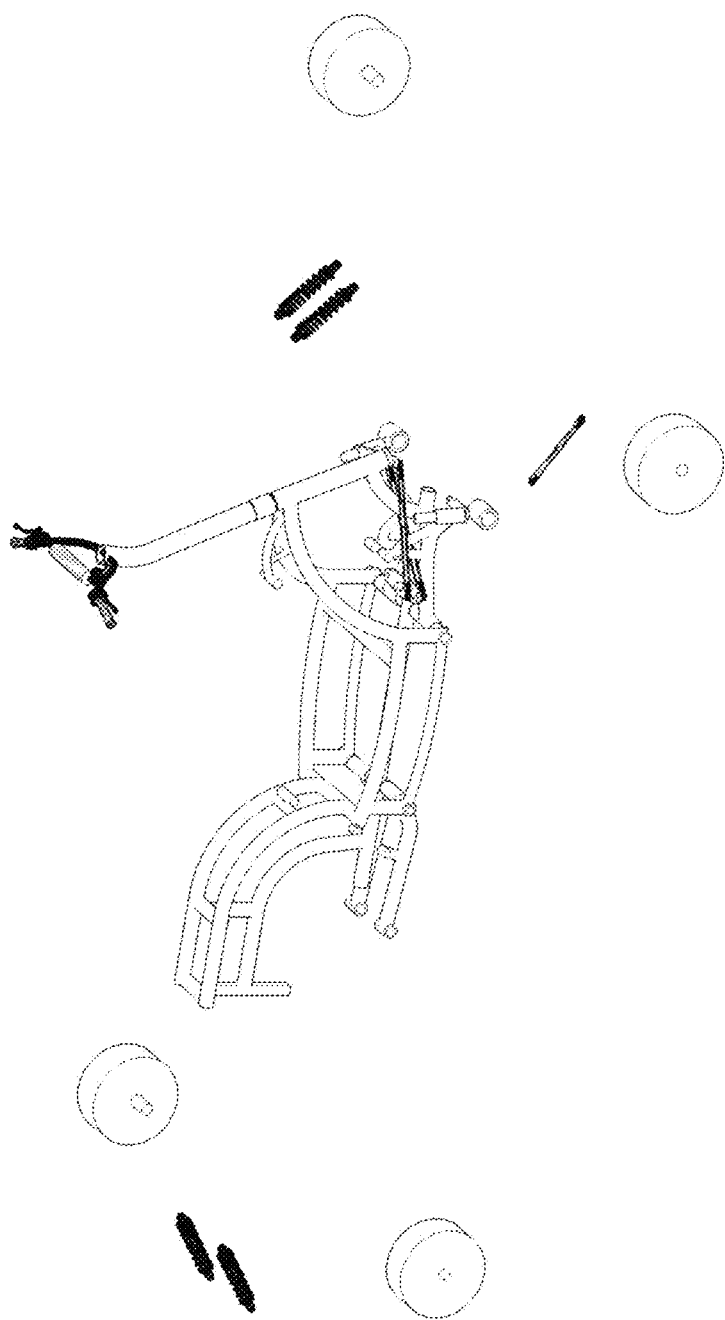
Figure 26:
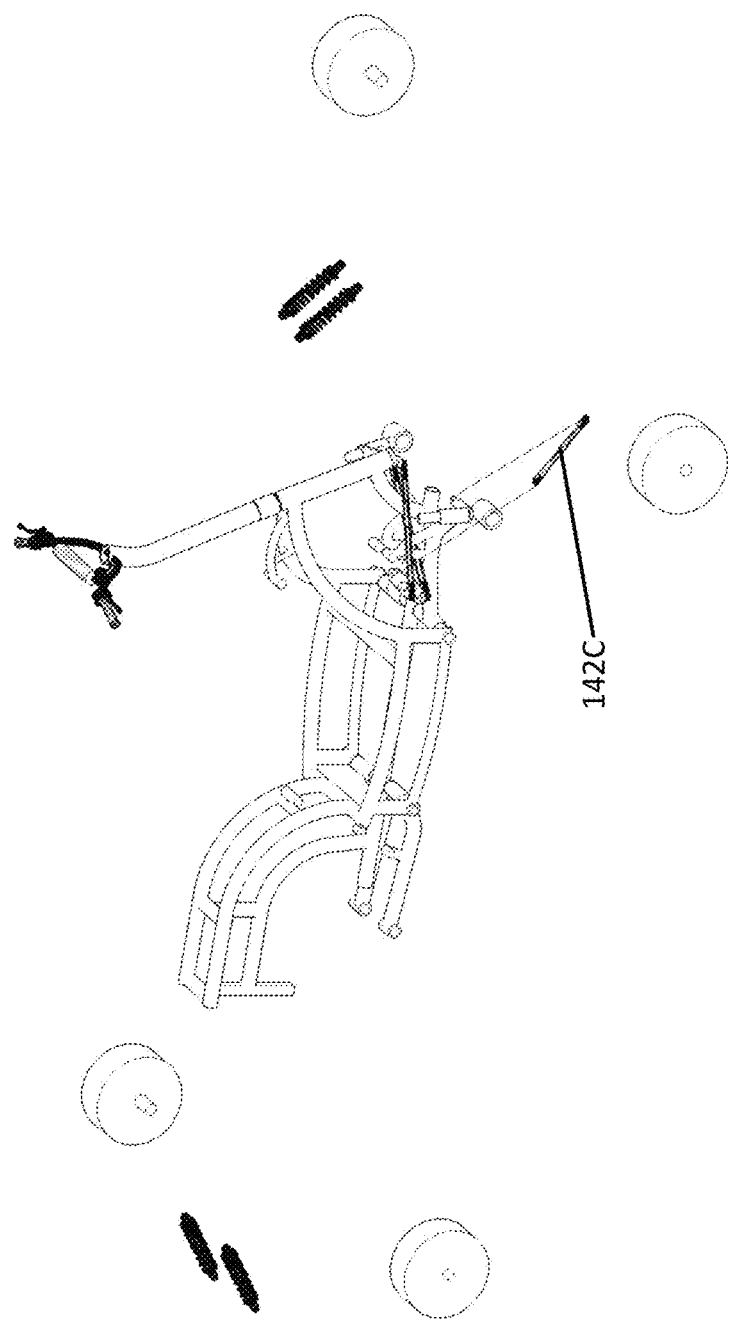
Figure 27:
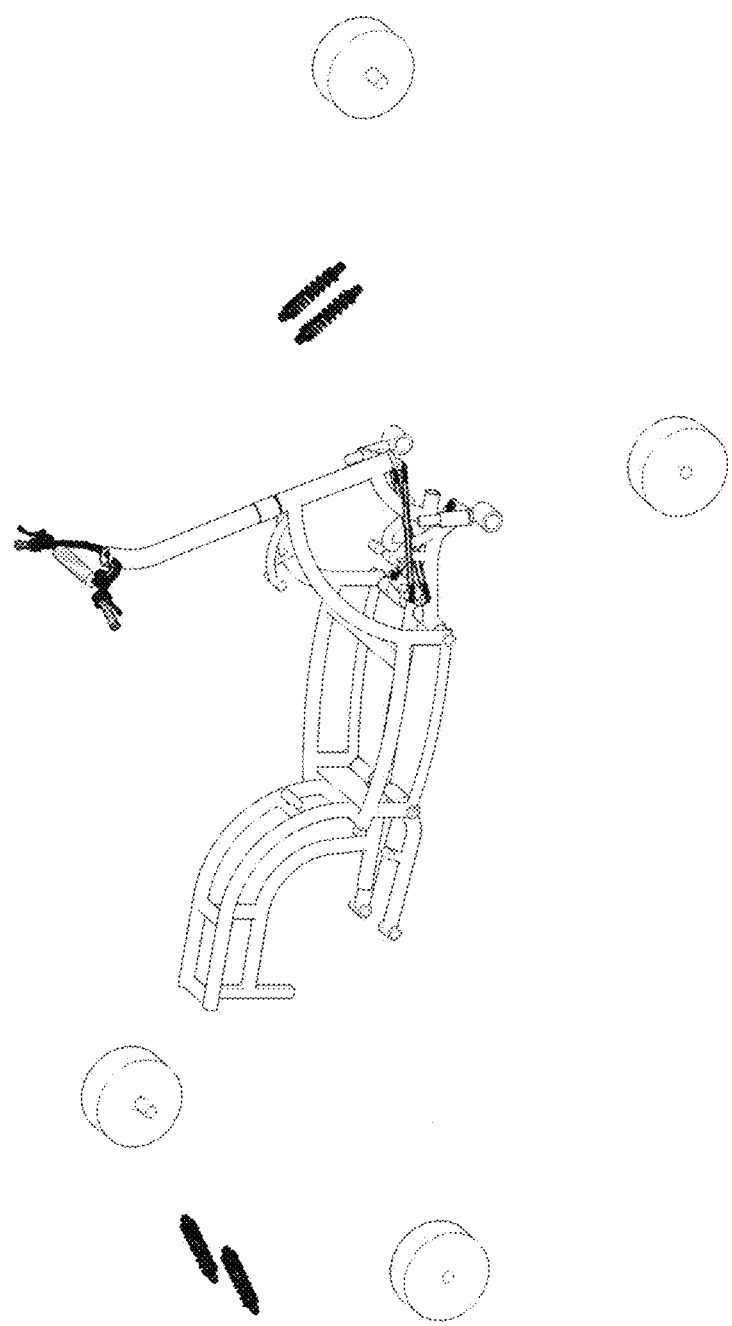

FIGS. 20-21 show a pair of secondary steering arms 140A and 140B coupled to a respective one of the steering knuckles 122A and 122B.

FIGS. 22-27 show the placement of three steering tie rods 142A, 142B and 142C. One rod 142A connects the primary steering arm to the Pitman arm 130. A second rod 142B connects the primary steering arm 138 to the right secondary steering arm 140A. A third rod 142C connects the primary steering arm 138 to the left secondary steering arm 140B. The tie rods, 142B and 142C cross over each other but do not contact each other at any point throughout the suspension travel. The tie rod ends are mounted to the primary steering arm 138 from front-to-back and located in close proximity to the suspension arm 118 pivot points in order to prevent bump-steer.

The steering geometry employed differs from conventional Ackerman steering geometry in that it is rotated 90 degrees because the front suspension 106 system is configured as front-to-back swing arms, and not side-to-side arms.

Figure 28:
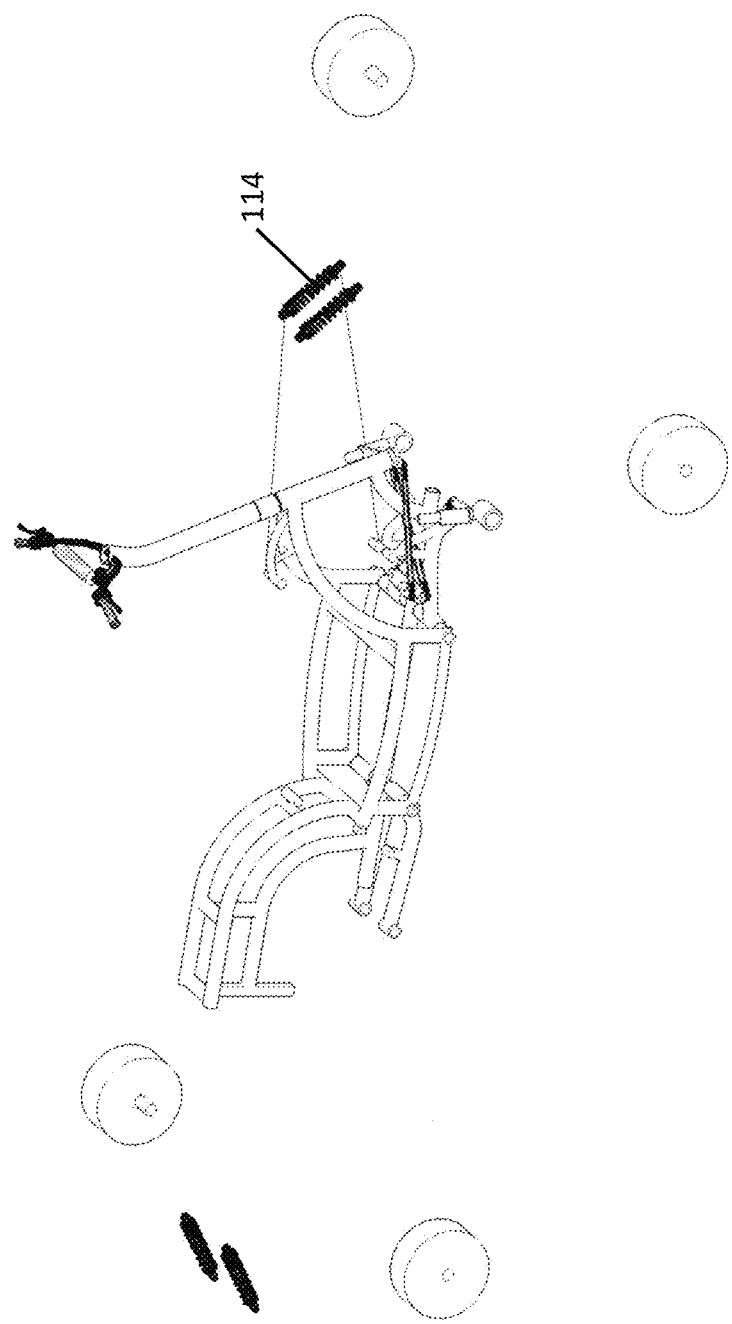
Figure 29:
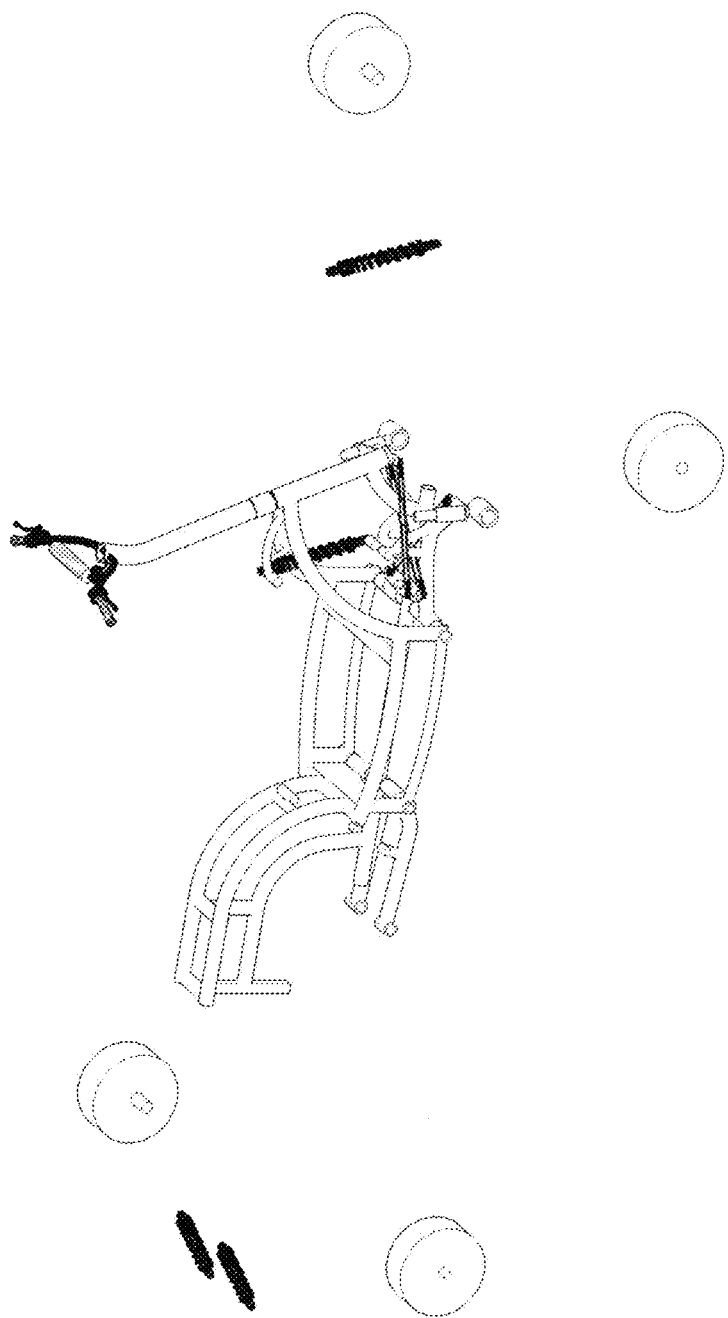
Figure 30:
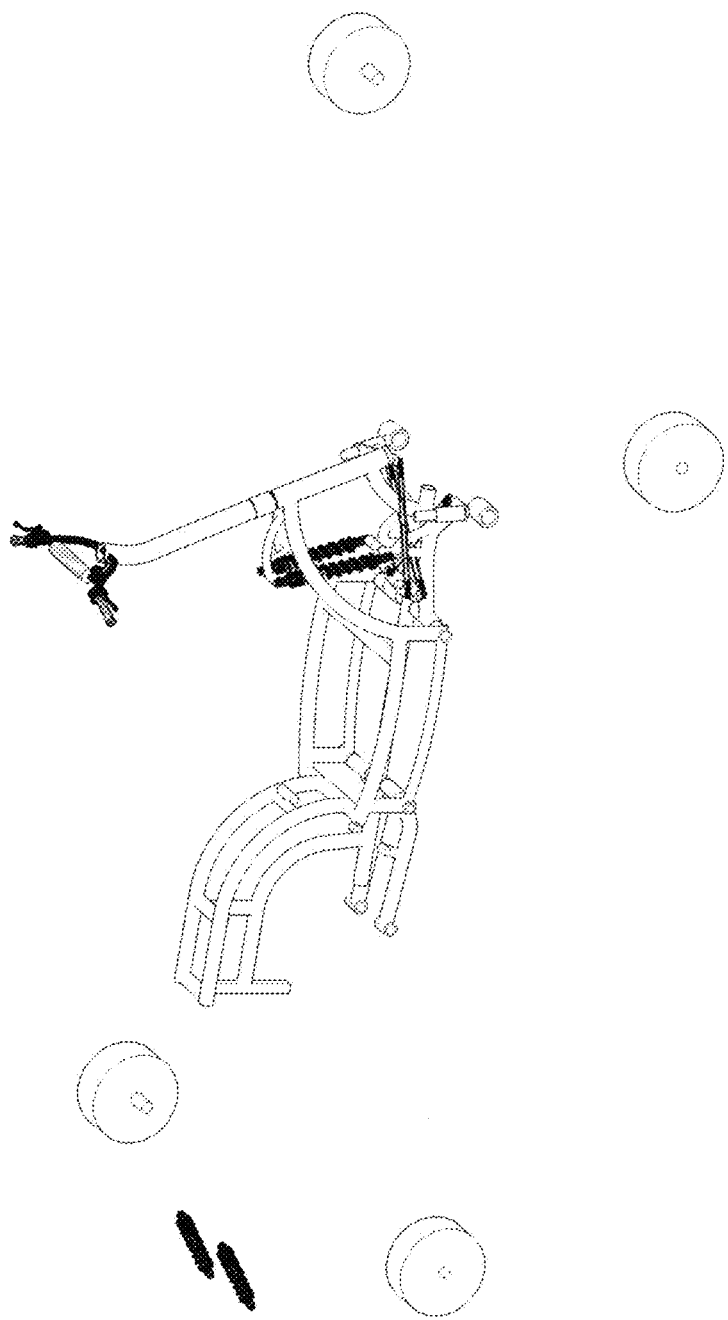

FIGS. 28-30 show the front shocks 114 being attached to the central frame portion 104 and the front suspension arms 118.

Figure 31:
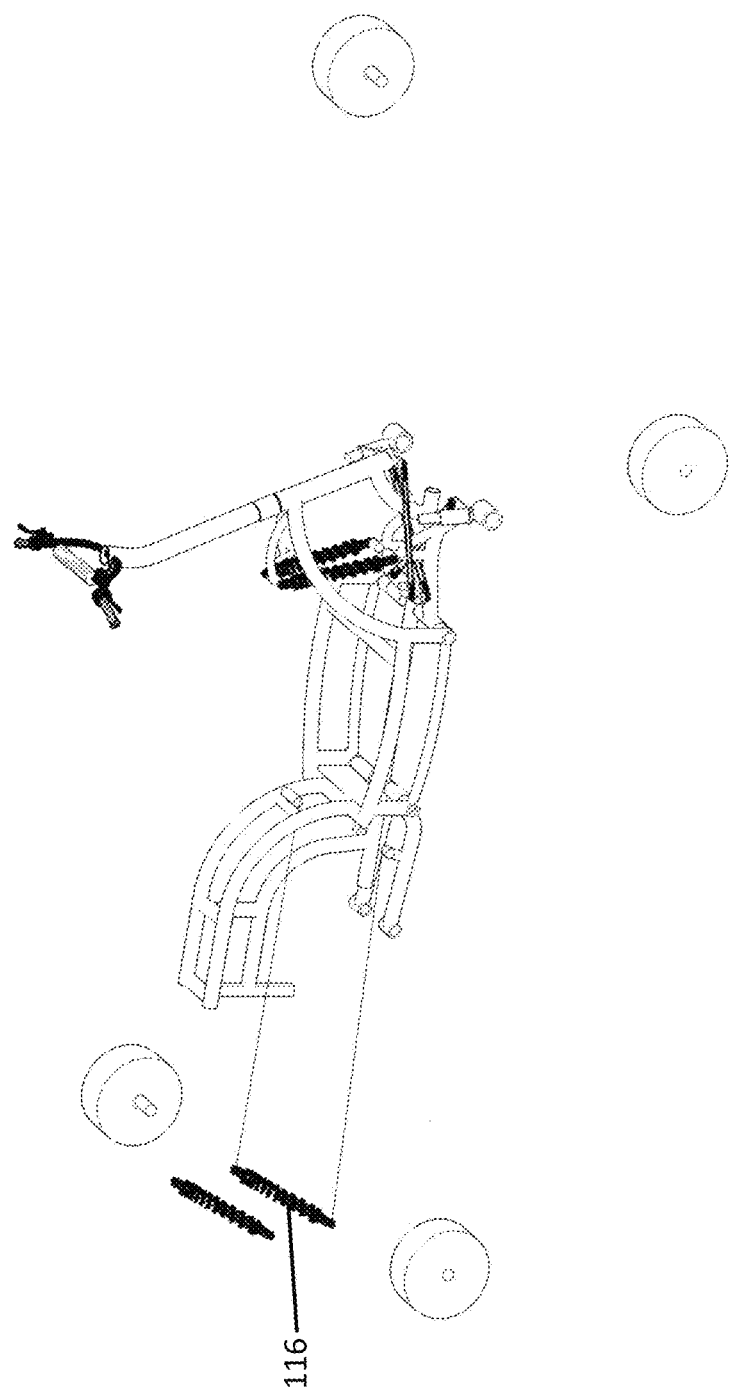
Figure 32:
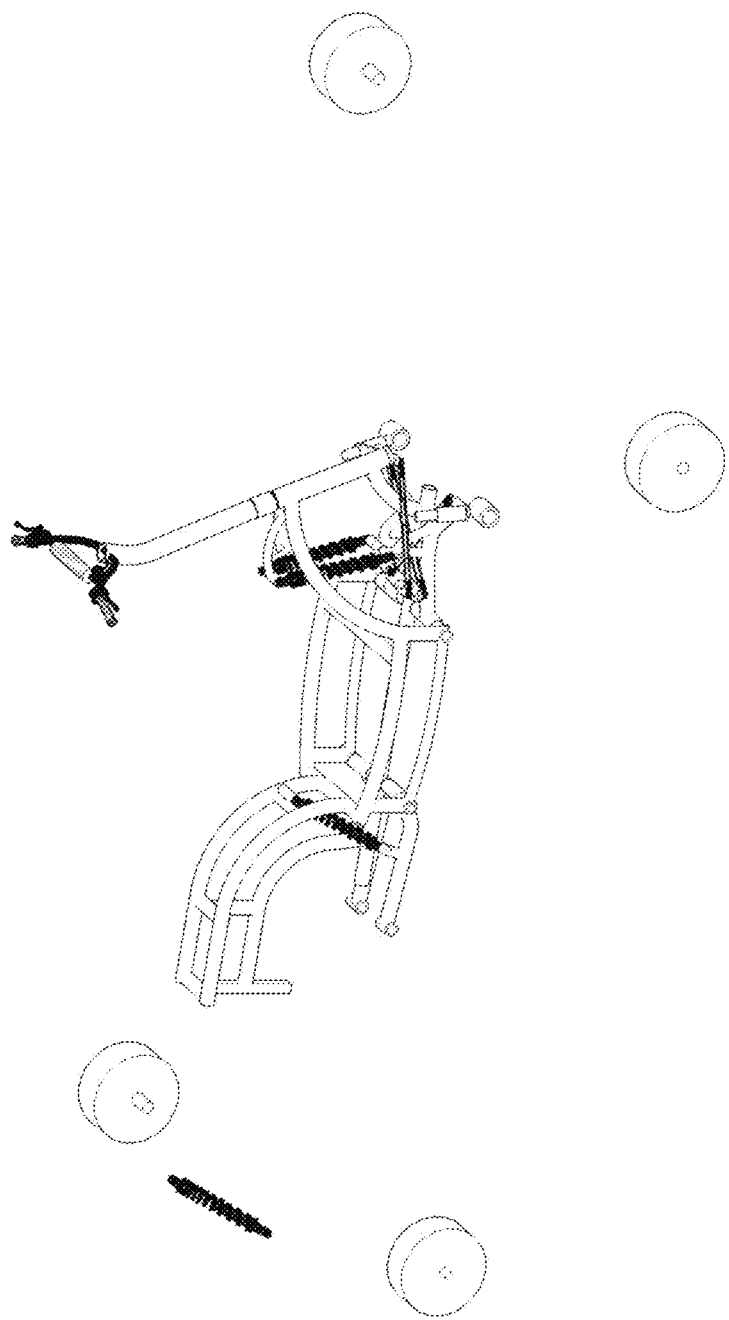

FIGS. 31-32 show the rear shocks 116 being attached to the central frame portion 104 and the rear suspension arms 120.

Figure 33:
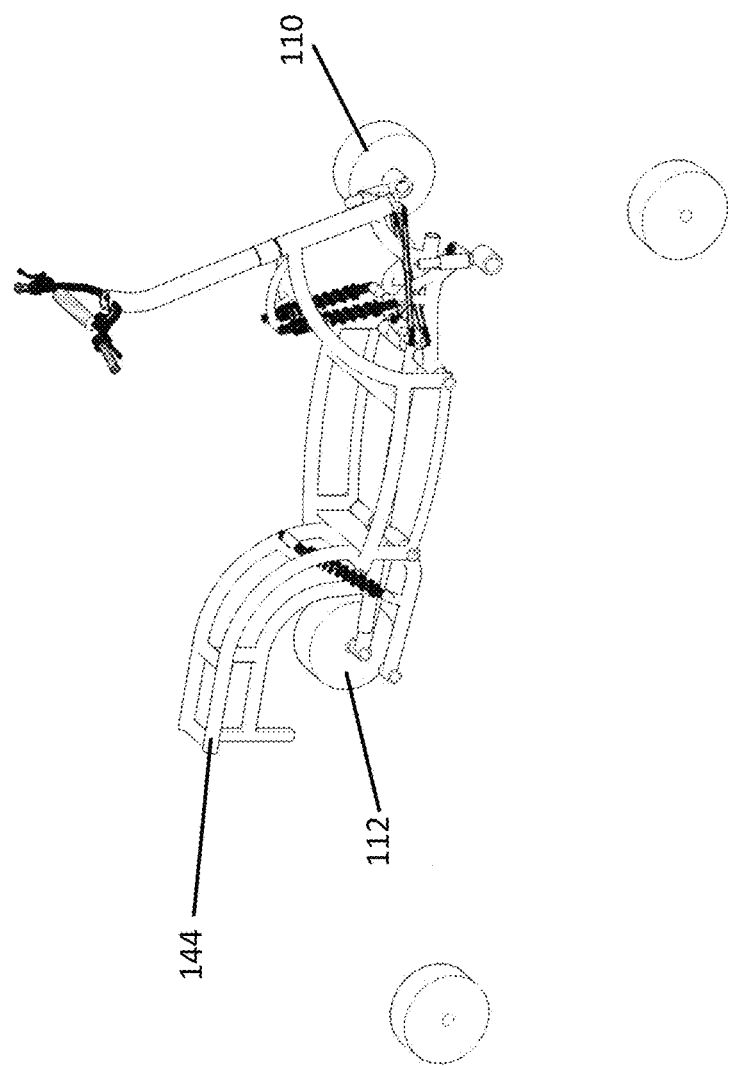

FIG. 33 shows attachment of the front wheel hubs 110 and rear wheel hubs 112 to their respective suspension arms.

Figure 39:
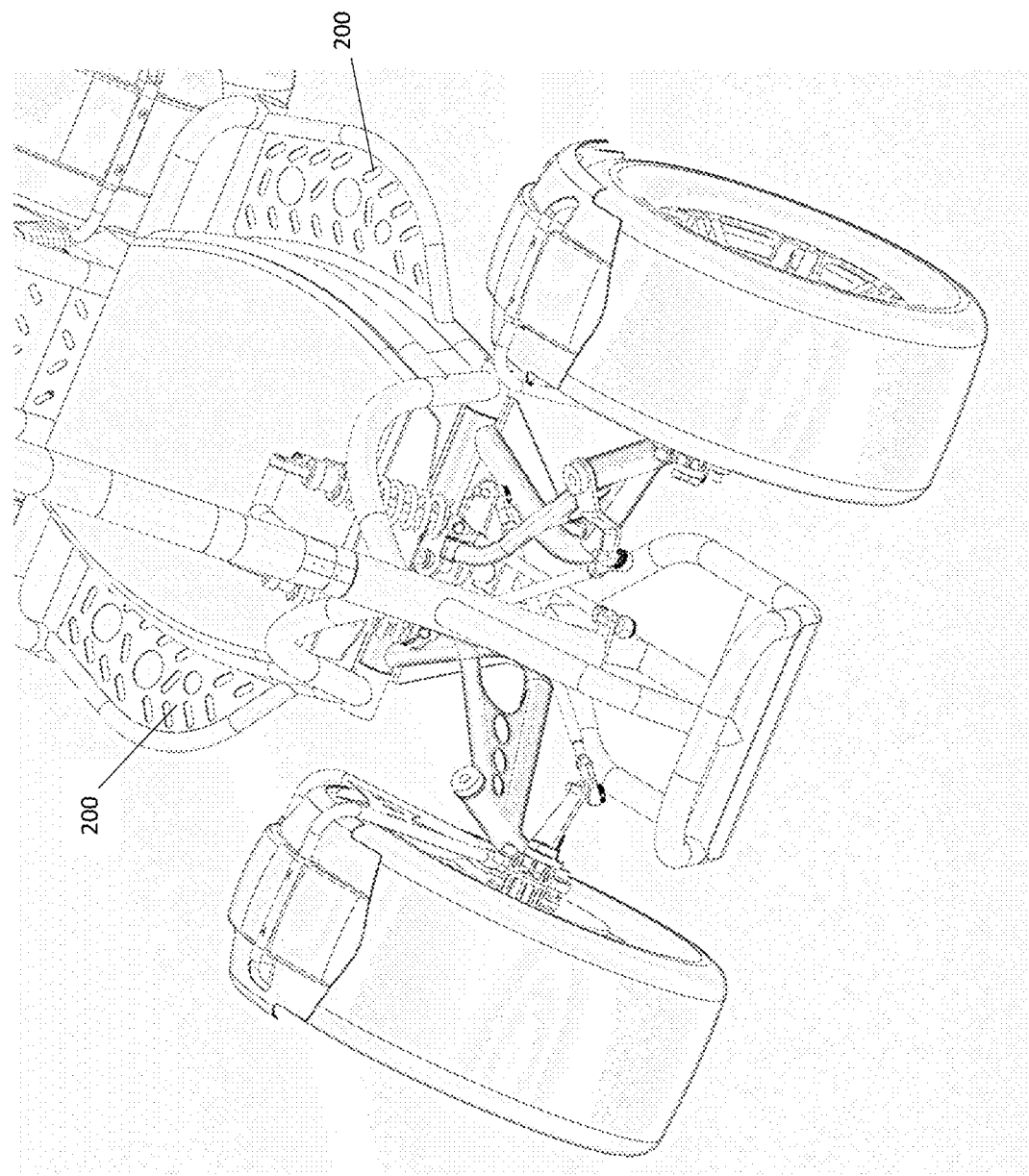
FIG. 39 is a perspective view of a utility vehicle in accordance with certain embodiments of the invention.

FIG. 39 shows an alternate embodiment of the steering system, with sealed roller bearings 123, tapered roller bearings 124 and thrust bearings 125 replaced by appropriate bushings.

In an alternate embodiment, the steering shaft may be jointed and locking, allowing it to be folded down when not in use.

In use, the user stands atop a planar platform atop the central frame portion or on the foot boards and grabs the handlebars. The user actuates the throttle and brakes to drive the utility vehicle. The steering system described herein has numerous advantages over a conventional Ackermann steering geometry as a result of its geometry and design. It provides easy and light steering, meaning that a low turning force is required from the user, provides reduced bump steer, meaning that uneven terrain generally does not create a back force to the user causing a change in steering attitude, and reduces steering shaft deflection.

A rear section 146 of the frame 102 that is rigidly attached to the central portion (or is an extension of the central portion) can be provided with cargo carrying baskets, compartments or other accessories. A modular mounting system may be attached to the rear frame section 146 which allows easy attachment and removal of accessories, and which permits the attachment of a rotatable utility bag or case which can store golf clubs, golf bags, rifles or other cargo horizontally, vertically, rotated at 45 degrees from vertical, or at any selected orientation. One or more passenger seats can also be attached to the rear section.

Multiple sets of rear wheel hubs can be provided for more weight capacity and/or more drive power.

Fairings can be provided over the rear wheels/tires so that the rear wheels and tires are almost completely covered from the side The tires provided to the wheels, which are coupled to the wheel hubs, are chosen to be suitable for the intended terrain where the vehicle will be used. For example, an all-terrain tire can be provided.

Figure 35:
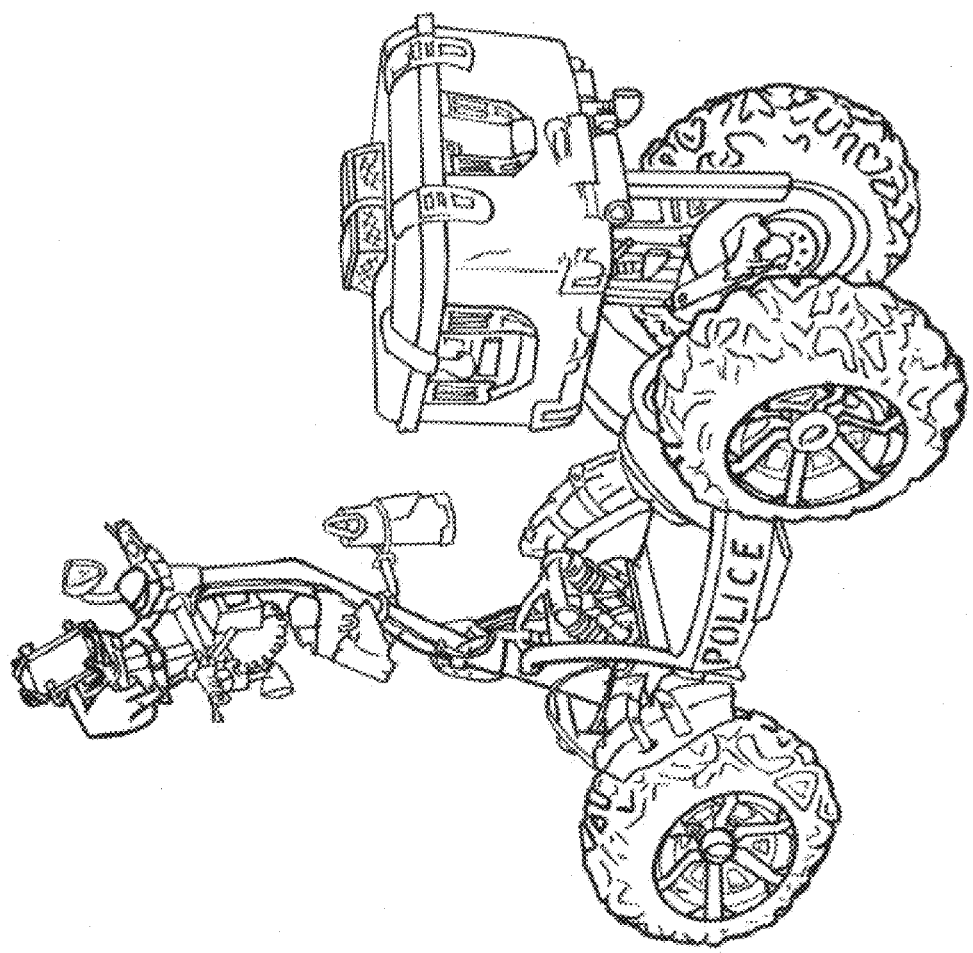
FIGS. 35-36 are photographs of a utility vehicle in accordance with certain embodiments of the invention.
Figure 36:
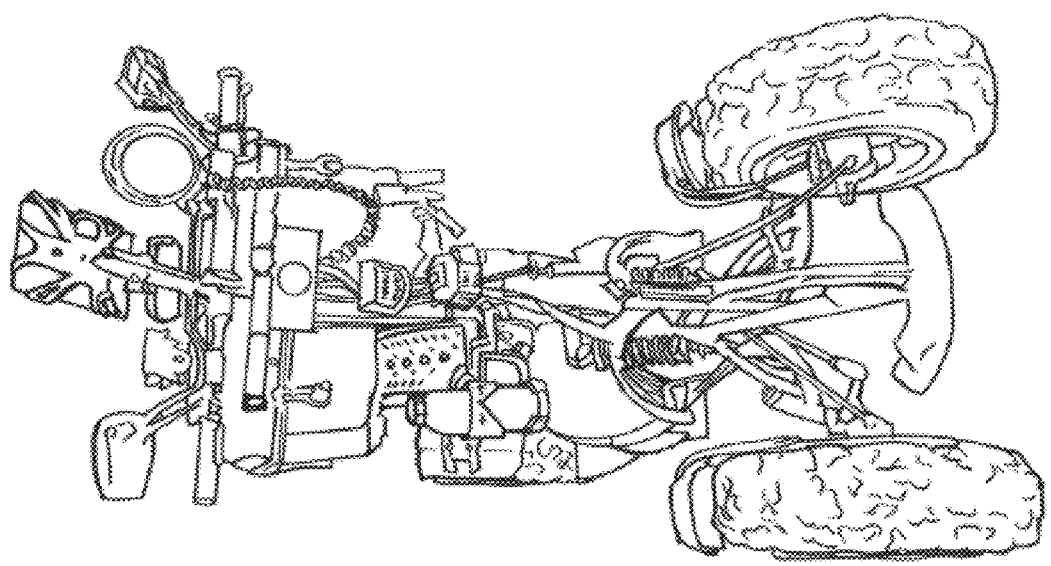

FIGS. 35-36 show the utility vehicle 100 according to an example embodiment configured and outfitted with accessories for law enforcement use.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed:

1. A motorized utility vehicle enabled for operation by a standing user, the vehicle comprising:
   a frame;
   a motor housed within the frame;
   two front wheel hubs;
   two rear wheel hubs;
   two front powered wheels connected to the front wheel hubs and the frame;
   two rear powered wheels connected to the rear wheel hubs and the frame;
   a steering column connected to the frame;
   a handlebar connected to the distal end of the steering column; and
   one or more hand operated brakes connected to at least one end of the handlebar;
      wherein each wheel hub is connected to an integrated electric hub motor that provides motive power to the vehicle;
      wherein the inner width (W1) between the insides of the front wheel hubs is greater than the outer width (W2) of the rear wheel hubs;
      wherein the track width of the front wheels is greater than the track width of the rear wheels;
      wherein the track width of a pair of wheels on a single axle of a vehicle is defined as the distance from the outer wheel hub on one wheel on the axle to the outer wheel hub on the other wheel on the same axle.

2. The vehicle of claim 1 wherein the motor is at least one electric motor.

3. The vehicle of claim 1, wherein the difference between the track widths of the front wheels and the rear wheels is at least the width of the front wheels.

4. The vehicle of claim 1, wherein the difference between the track widths of the front wheels and the rear wheels is at least 10 inches.

5. The vehicle of claim 2, additionally comprising at least one standing foot board connected to the frame.

6. The vehicle of claim 1, wherein the foot board is attached to the vehicle such that the foot board is angled upward relative to the horizontal plane.

7. The vehicle of claim 6, wherein the foot board angle is between 2 and 12 degrees relative to the horizontal plane.

8. The vehicle of claim 6, wherein the foot board angle is 4 degrees.

9. The vehicle of claim 2 further comprising at least one of a front and a rear independent steering and suspension system having a pair of front suspension arms and rear suspension arms.

10. The vehicle of claim 9, wherein the front and rear steering and suspension system further comprises swing arms, wherein the swing arms are oriented front to back.

11. The vehicle of claim 9 wherein each pair of the front wheel hubs are rotatably coupled to one of the front suspension arms and each of pair of the rear wheel hubs are rotatably coupled to one of the rear suspension arms.

12. The vehicle of claim 5 further comprising one or more battery housed beneath the standing foot board and contained within the frame.

* * * * *